US012139336B2

(12) United States Patent
Austrheim

(10) Patent No.: US 12,139,336 B2
(45) Date of Patent: Nov. 12, 2024

(54) TRANSPORT OF CONTAINER HANDLING VEHICLES BETWEEN STORAGE GRIDS OF DIFFERENT HEIGHTS

(71) Applicant: Autostore Technology AS, Nedre Vats (NO)

(72) Inventor: Trond Austrheim, Etne (NO)

(73) Assignee: AutoStore Technology AS, Nedre Vats (NO)

( * ) Notice: Subject to any disclaimer, the term of this patent is extended or adjusted under 35 U.S.C. 154(b) by 581 days.

(21) Appl. No.: 17/413,153

(22) PCT Filed: Dec. 16, 2019

(86) PCT No.: PCT/EP2019/085362
§ 371 (c)(1),
(2) Date: Jun. 11, 2021

(87) PCT Pub. No.: WO2020/127060
PCT Pub. Date: Jun. 25, 2020

(65) Prior Publication Data
US 2022/0041372 A1 Feb. 10, 2022

(30) Foreign Application Priority Data
Dec. 20, 2018 (NO) .................................. 20181658

(51) Int. Cl.
B65G 1/04 (2006.01)
B61B 5/02 (2006.01)
B66B 9/00 (2006.01)

(52) U.S. Cl.
CPC ............. *B65G 1/0464* (2013.01); *B61B 5/02* (2013.01); *B66B 9/00* (2013.01)

(58) Field of Classification Search
CPC ................ B65G 1/0464; B65G 1/0478; B65G 1/0485
See application file for complete search history.

(56) References Cited

U.S. PATENT DOCUMENTS

| 2005/0118003 A1 | 6/2005 | Mitchell et al. |
| 2008/0247848 A1 | 10/2008 | Freudelsperger |
| 2014/0277693 A1 | 9/2014 | Naylor |
| 2017/0253430 A1 | 9/2017 | Buzan et al. |

(Continued)

FOREIGN PATENT DOCUMENTS

| CN | 1886313 A | 12/2006 |
| CN | 103459272 A | 12/2013 |

(Continued)

OTHER PUBLICATIONS

Office Action issued in the counterpart Chinese Patent Application No. 2019800793131, mailed on Jun. 2, 2022 (10 pages).

(Continued)

*Primary Examiner* — Kaitlin S Joerger
(74) *Attorney, Agent, or Firm* — Baker Botts L.L.P.

(57) ABSTRACT

An automated storage and retrieval system includes a first track system and a second track system. The first track system includes a first set of parallel tracks arranged in a first horizontal plane and extending in a first direction of the first track system and a second set of parallel tracks arranged in the first horizontal plane and extending in a second direction of the first track system which is orthogonal to the first direction of the first track system. The first and second sets of tracks of the first track system forming a grid pattern in the first horizontal plane including a plurality of adjacent grid cells. Each grid cell of the first track system comprising a grid opening defined by a pair of neighboring tracks of the first set of tracks and a pair of neighboring tracks of the second set of tracks. Storage columns are located beneath the first track system for storing storage containers in a plurality of stacks. Each storage column is located vertically below a grid opening. The second track system includes a third set of parallel tracks arranged in a second horizontal plane and extending in a first direction of the second track system, and a fourth set of parallel tracks arranged in the second horizontal plane and extending in a second direction of the second track system which is orthogonal to the first direction of the second track system. The third and fourth sets of tracks forming a grid pattern in the second horizontal (Continued)

plane including a plurality of adjacent grid cells. Each grid cell of the second track system including a grid opening defined by a pair of neighboring tracks of the third set of tracks and a pair of neighboring tracks of the fourth set of tracks. Storage columns are located beneath the second track system for storing storage containers in a plurality of stacks. Each storage column is located vertically below a grid opening. The first horizontal plane of the first track system and second horizontal plane of the second track system are arranged vertically displaced relative each other. The automated storage and retrieval system further includes a vehicle lift device for transfer of at least one vehicle arranged on the first track system to the second transfer system and vice versa. The vehicle lift device includes a platform arranged to carry the vehicle and a lift mechanism arranged to move the platform between: a first lift stop position establishing access between the platform and the first track system for enabling relocation of the vehicle between a support position on the platform and an operative position on the first track system, and a second lift stop position establishing access between the platform and the second track system for enabling relocation of the vehicle between the support position on the platform and an operative position on the second track system.

12 Claims, 18 Drawing Sheets

(56) References Cited

U.S. PATENT DOCUMENTS

2023/0211948 A1\* 7/2023 Austrheim ............ B65G 1/0464
414/281

FOREIGN PATENT DOCUMENTS

| CN | 104837747 A | 8/2015 |
|---|---|---|
| CN | 106575391 A | 4/2017 |
| CN | 206485851 U | 9/2017 |
| CN | 107466333 A | 12/2017 |
| CN | 107720072 A | 2/2018 |
| DE | 102009051800 A1 | 5/2011 |
| DE | 102011014394 A1 | 9/2012 |
| DE | 102017222801 A1 | 6/2019 |
| EP | 2673219 B1 | 3/2018 |
| JP | S52-20676 U | 2/1977 |
| NO | 317366 B1 | 10/2004 |
| WO | 2012/026824 A1 | 3/2012 |
| WO | 2012/134269 A1 | 10/2012 |
| WO | 2014/075937 A1 | 5/2014 |
| WO | 2014/090684 A1 | 6/2014 |
| WO | 2015/193278 A1 | 12/2015 |
| WO | 2015/197709 A1 | 12/2015 |
| WO | 2016/166306 A1 | 10/2016 |
| WO | 2018/162757 A1 | 9/2018 |

OTHER PUBLICATIONS

International Search Report issued in Application No. PCT/EP2019/085362, mailed on Mar. 20, 2020 (5 pages).
Written Opinion issued in International Application No. PCT/EP2019/085362, mailed on Mar. 20, 2020 (12 pages).
Search Report issued in Norwegian Application No. 20181658, mailed on Jun. 21, 2019 (2 pages).
Office Action issued in the counterpart European Patent Application No. 19824292.7, mailed on Mar. 24, 2023 (3 pages).

\* cited by examiner

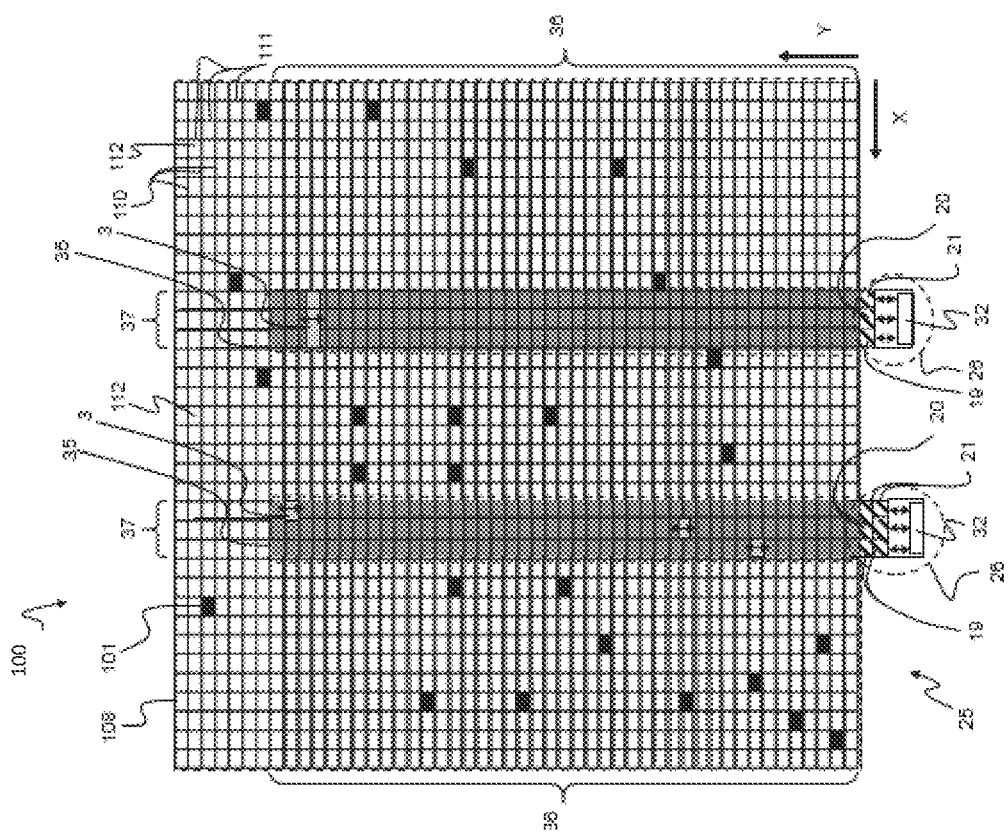

TRANSPORT OF CONTAINER HANDLING VEHICLES BETWEEN STORAGE GRIDS OF DIFFERENT HEIGHTS

Application PCT/EP2019/085362 claims priority from Application 20181658 filed on Dec. 20, 2018 in Norway. The entire contents of these applications are incorporated herein by reference in their entirety.

TECHNICAL FIELD

The present invention relates to an automated storage and retrieval system, a storage facility and a method thereof.

BACKGROUND AND PRIOR ART

FIG. 1 discloses a typical prior art automated storage and retrieval system 1 with a framework structure 100 and FIGS. 2A and B disclose a prior art container handling vehicle 101 of such a system 1.

The framework structure 100 comprises a plurality of upright members 102 and a plurality of horizontal members 103 which are supported by the upright members 102. The members 102, 103 may typically be made of metal, e.g. extruded aluminum profiles.

The framework structure 100 defines a storage grid 104 comprising storage columns 105 arranged in rows, in which storage columns 105 storage containers 106, also known as bins, are stacked one on top of another to form stacks 107. Each storage container 106 may typically hold a plurality of product items (not shown), and the product items within a storage container 106 may be identical, or may be of different product types depending on the application. The storage grid 104 guards against horizontal movement of storage containers 106 in the stacks 107, and guides vertical movement of the containers 106, but does normally not otherwise support the storage containers 106 when stacked.

The horizontal members 103 comprise a track or rail system 108 arranged in a grid pattern across the top of the storage columns 105, on which track system 108 a plurality of container handling vehicles 101 are operated to raise storage containers 106 from and lower storage containers 106 into the storage columns 105, and also to transport the storage containers 106 above the storage columns 105. The track system 108 comprises a set of parallel rails or tracks 110 arranged to guide movement of the container handling vehicles 101 in a first direction X across the top of the frame structure 100, and another set of parallel rails or tracks 111, arranged perpendicular to the set of tracks 110 in the first direction X, to guide movement of the container handling vehicles 101 in a second direction Y, which is perpendicular to the first direction X. In this way, the track system 108 defines grid columns 112 above which the container handling vehicles 101 can move laterally above the storage columns 105, i.e. in a plane which is parallel to the horizontal X-Y plane.

Each container handling vehicle 101 comprises a vehicle body 101a, and first and second sets of wheels 101b, 101c which enable the lateral movement of the container handling vehicle 101 in the X direction and in the Y direction, respectively. In FIGS. 2A and B two wheels in each set are visible. The first set of wheels 101b is arranged to engage with two adjacent tracks/rails of the set 110 of tracks/rails arranged in a first direction X, and the second set of wheels 101c is arranged to engage with two adjacent tracks/rails of the set 111 of tracks in the second direction Y. Each set of wheels 101b, 101c can be lifted and lowered, so that the first set of wheels 101b and/or the second set of wheels 101c can be engaged with the respective set of rails 110, 111 at any one time.

In FIG. 2A the container handling vehicle 101 also comprises a lifting device (not shown) arranged inside a cavity of the vehicle body 101a for vertical transportation of storage containers 106, e.g. raising a storage container 106 from and lowering a storage container 106 into a storage column 105. The lifting device comprises a gripping device which is adapted to engage a storage container 106, and which gripping device can be lowered from the vehicle body 101a so that the position of the gripping device with respect to the vehicle body 101a can be adjusted in a third direction Z which is orthogonal the first direction X and the second direction Y. Such a vehicle is described in WO2014/090684A1, the contents of which are incorporated herein by reference.

In FIG. 2B the container handling vehicle 101 comprises a cantilever construction having a lifting device for vertical transportation of storage containers 106, e.g. raising a storage container 106 from and lowering a storage container 106 into a storage column 105. The lifting device comprises a gripping device 101d which is adapted to engage a storage container 106, and which gripping device 101d can be lowered from the vehicle body 101a so that the position of the gripping device with respect to the vehicle body 101a can be adjusted in a third direction Z which is orthogonal the first direction X and the second direction Y. Such a vehicle is described in detail in e.g. NO317366, the contents of which are also incorporated herein by reference.

Conventionally, and also for the purpose of this application, Z=1 identifies the uppermost layer of the grid 104, i.e. the layer immediately below the track system 108, Z=2 the second layer below the track system 108, Z=3 the third layer etc. In the exemplary prior art grid 104 disclosed in FIG. 1, Z=8 identifies the lowermost, bottom layer of the grid 104. Consequently, as an example, and using the Cartesian coordinate system X, Y, Z indicated in FIG. 1, the storage container identified as 106' in FIG. 1 can be said to occupy grid location or cell X=10, Y=2, Z=3. The container handling vehicles 101 can be said to travel in layer Z=0 and each grid column 112 can be identified by its X and Y coordinates.

The container handling vehicles 101 may have a footprint, i.e. an extent in the X and Y directions, which is generally equal to the lateral extent/area of a grid column 112, i.e. the extent of a grid column 112 in the X and Y directions, e.g. as is described in WO2015/193278A1, the contents of which are incorporated herein by reference. The term "lateral" used herein may mean "horizontal".

Alternatively, the container handling vehicles 101 may have a footprint which is larger than the lateral extent/area defined by a grid column 112, e.g. as is disclosed in WO2014/090684A1.

The track system 108 may be a single track system, as is shown in FIG. 3.

Alternatively, the track system 108 may be a double track system, as is shown in FIG. 4, thus allowing a container handling vehicle 101 having a footprint generally corresponding to the lateral extension/area defined by a grid column 112 to travel along a row of grid columns even if another container handling vehicle 101 is positioned above a grid column neighboring that row. Both the single and double track system forms a grid pattern in the horizontal plane P comprising a plurality of rectangular and uniform grid locations or grid cells 122, where each grid cell 122 comprises a grid opening 115 being delimited by a pair of parallel tracks 110a, 110b of the tracks 110 and a pair of tracks 111a, 111b of the other set of tracks 111. In FIG. 4 the grid cell 122 is indicated by a dashed box.

Each grid cell 122 has a width which is typically within the interval of 30 to 150 cm, and a length which is typically within the interval of 50 to 200 cm. Each grid opening 115 has a width and a length which is typically 2 to 10 cm less than the width and the length of the grid cell 122.

In a storage grid 104, a majority of the grid columns 112 are storage columns 105, i.e. grid columns 105 where storage containers 106 are stored in stacks 107. However, a grid 104 normally has at least one grid column 112 which is used not for storing storage containers 106, but which comprises a location where the container handling vehicles 101 can drop off and/or pick up storage containers 106 so that they can be transported to a working surface/access or transfer station, such as the one described in WO 2012/026824 A1. In this way the storage containers 106 can be accessed from outside of the grid 104 or transferred out of or into the grid 104. Within the art, such a location where the container handling vehicles 101 can drop off and/or pick up storage containers is normally referred to as a "port" and the grid column 112 in which the port is located may be referred to as a "port column" 19,20.

The grid 104 in FIG. 1 comprises two port columns 19 and 20. The first port column 19 may for example be a dedicated drop-off port column where the container handling vehicles 101 can drop off storage containers to be transported to an access or a transfer station, and the second port column 20 may be a dedicated pick-up port column where the container handling vehicles 101 can pick up storage containers 106 that have been transported to the grid 104 from an access or a transfer station.

The access station may typically be a picking or a stocking station where product items are removed from or positioned into the storage containers 106. In a picking or a stocking station, the storage containers 106 are normally never removed from the automated storage and retrieval system 1, but are returned into the grid 104 once accessed. A port can also be used for transferring storage containers out of or into the grid 104, e.g. for transferring storage containers 106 to another storage facility (e.g. to another grid or to another automated storage and retrieval system), to a transport vehicle (e.g. a train or a lorry), or to a production facility.

A conveyor system comprising conveyors is normally employed to transport the storage containers between the ports 19,20 and the access station.

If the port and the access station are located at different levels, the conveyor system may comprise a lift device for transporting the storage containers 106 vertically between the port 19,20 and the access station.

The conveyor system may be arranged to transfer storage containers 106 between different grids, e.g. as is described in WO2014/075937A1, the contents of which are incorporated herein by reference.

When a storage container 106 stored in the grid 104 disclosed in FIG. 1 is to be accessed, one of the container handling vehicles 101 is instructed to retrieve the target storage container 106 from its position in the grid 104 and transport it to the drop-off port 19. This operation involves moving the container handling vehicle 101 to a grid location above the storage column 105 in which the target storage container 106 is positioned, retrieving the storage container 106 from the storage column 105 using the container handling vehicle's 101 lifting device (not shown), and transporting the storage container 106 to the drop-off port 19. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port 19, or with one or a plurality of other cooperating container handling vehicles. Alternatively, or in addition, the automated storage and retrieval system 1 may have container handling vehicles specifically dedicated to the task of temporarily removing storage containers from a storage column 105. Once the target storage container 106 has been removed from the storage column 105, the temporarily removed storage containers can be repositioned into the original storage column 105. However, the removed storage containers may alternatively be relocated to other storage columns for instance so called transfer columns.

When a storage container 106 is to be stored in the grid 104, one of the container handling vehicles 101 is instructed to pick up the storage container 106 from the pick-up port 20 and transport it to a grid location above the storage column 105 where it is to be stored. After any storage containers positioned at or above the target position within the storage column stack 107 have been removed, the container handling vehicle 101 positions the storage container 106 at the desired position. The removed storage containers may then be lowered back into the storage column 105, or relocated to other storage columns.

For monitoring and controlling the automated storage and retrieval system 1, e.g. monitoring and controlling the location of respective storage containers 106 within the grid 104; the content of each storage container 106; and the movement of the container handling vehicles 101 so that a desired storage container 106 can be delivered to the desired location at the desired time without the container handling vehicles 101 colliding with each other, the automated storage and retrieval system 1 comprises a control system which typically is computerized and which typically comprises a database for keeping track of the storage containers 106.

A problem associated with known automated storage and retrieval systems 1 is that the area surrounding the ports 19,20 may become congested with container handling vehicles 101 instructed to drop off or pick up storage containers 106. This may seriously impede the operation of the automated storage and retrieval system 1. In small systems, this situation may possibly be alleviated by adding ports to the grid, as this will allow the container handling vehicles 101 to be distributed among a larger number of ports in order to avoid congestion. However, if ports are added, the conveyor system infrastructure must normally be increased. This requires space, which may not necessarily be available. Also, adding conveyor system infrastructure is costly.

Furthermore, the current trend within the automated storage and retrieval system industry is that there is an increasing demand for larger storage grids. Since the number of storage containers stored in a grid generally scales as the volume of the grid, but the space available for ports generally scales as the surface of the grid, increasing the number of ports will not necessarily solve the congestion problem when the grid size increases.

Another problem related to prior art automated storage and retrieval systems is the utilization of storage facilities such as a warehouse for housing the automated storage and retrieval systems. As mentioned, the demand for larger sized automated storage and retrieval systems is increasing; a demand that may be challenged by the specific volumetric layout of certain warehouses when orienting the automated storage and retrieval systems in a suitable position to optimize the available storage space. The provision and working of the automated storage and retrieval systems limits the actual outlays and options when fitting the systems into the storage facility.

Each prior art automated storage and retrieval systems has been arranged as a self-contained entity capable of storing and handling the storage containers, as well as delivery and retrieval of the storage containers. The vehicles handling the storage containers operate in the horizontal plane P on the top of the system, and to optimize the operation of the automated storage and retrieval system, the area of the horizontal plane and volume of the storage grid underneath the horizontal plane P are balanced to obtain an efficient working of the vehicles.

The housing of large scale automated storage and retrieval systems obviously demands a storage facility with a large volume and ideally a cubic or rectangular storage space offers the most suitable premises for optimizing the operation of the automated storage and retrieval system.

However, not all storing facilities display an efficient cubic or rectangular storage space. The housing may comprise spaces of different configurations and/or dimensions. The ceiling heights may for instance differ from one space to another, and the ceiling may even be slanting.

Given these non-ideal premises, an optimized utilization of the available space is obtained with the prior art automated storage and retrieval systems being fitted into the space of the housing having the largest volume. Consequently, some of the smaller spaces may be left vacant and thus valuable storage space is wasted.

In order to optimize available storage space within a warehouse a prior art automated storage and retrieval systems introduces a bin lift for conveying a storage container from grids that are located at different vertical levels on top of each other and to a delivery station (see WO 2014/075937 A which is hereby incorporated by reference).

The operation of the prior art bin lift necessitates the presence of vehicles for delivering and receiving the storage bins for the transfer of storage containers to the delivery station and in between the grids. The solution is suitable for delivering and receiving storage containers to and from the delivery station and when using the bin lift for transferring storage in between grids. This prior art operation requires organizing available vehicles to be prepared for delivery and receiving the storage containers at their respective storage levels.

In view of the above, it is desirable to provide an automated storage and retrieval system, and a method for operating such a system, that solve or at least mitigate one or more of the aforementioned problems related to the use of prior art storage and retrieval systems.

SUMMARY OF THE INVENTION

The present invention is set forth and characterized in the independent claims, while the dependent claims describe other characteristics of the invention.

In particular, the invention concerns an automated storage and retrieval system comprising a first track system and a second track system.

The first track system comprises a first set of parallel tracks arranged in a first horizontal plane (P1) and extending in a first direction of the first track system (X'), and a second set of parallel tracks arranged in the first horizontal plane (P1) and extending in a second direction of the first track system (Y') which is orthogonal to the first direction of the first track system (X'). Consequently, the first and second sets of tracks form a grid pattern in the first horizontal plane (P1) comprising a plurality of adjacent grid cells, each comprising a grid opening defined by a pair of neighboring tracks of the first set of tracks and a pair of neighboring tracks of the second set of tracks. A plurality of stacks of storage containers can be arranged in storage columns located beneath the first track system, wherein each storage column is located vertically below the grid opening.

The system may further comprise a first storage container port column having a first port for transferring the storage containers between the first track system and a first access station and a plurality of first track system transfer columns located beneath the first track system for temporarily storing storage containers when in transit between the storage columns and the first storage container port column. The storage container handling vehicle is configured to transport the storage containers between the storage columns and the first track system transfer columns and a port access vehicle configured to transport the storage containers between the first track system transfer columns and the first storage container port column.

The system further comprises the second track system comprising a third set of parallel tracks arranged in a second horizontal plane (P2) and extending in a first direction of a second track system (X"), and a fourth set of parallel tracks arranged in the second horizontal plane (P2) and extending in a second direction of the second track system (Y") which is orthogonal to the first direction of the second track system (X"). Consequently, the third and fourth sets of tracks form a grid pattern in the second horizontal plane (P2) comprising a plurality of adjacent grid cells, each comprising a grid opening defined by a pair of neighboring tracks of the third set of tracks and a pair of neighboring tracks of the fourth set of tracks. A plurality of stacks of storage containers can be arranged in storage columns located beneath the second track system, wherein each storage column is located vertically below the grid opening.

The system may further comprise a second storage container port column having a second port for transferring the storage containers between the second track system and a second access station and a plurality of second track system transfer columns located beneath the second track system for temporarily storing storage containers when in transit between the storage columns and the second storage container port column. The storage container handling vehicle is configured to transport the storage containers between the storage column and the second track system transfer columns, and a port access vehicle configured to transport the storage containers between the second track system transfer columns and the second storage container port column.

The first horizontal plane (P1) of the first track system and second horizontal plane (P2) of the second track system are arranged vertically displaced relative each other. The system may further comprise a plurality of storage container handling vehicles for lifting and moving storage containers stacked in the stacks. Each vehicle can be configured to move on the first track system and the second track system. Each vehicle, comprises a vehicle body and a wheel assembly connected to the vehicle body. The wheel assembly being configured to guide the vehicle along the first track systems in the first direction (X') or in the second direction (Y'), or both directions, and/or to guide the vehicle along the second track system in the first direction (X") or in the second direction (Y"), or both directions.

The automated storage and retrieval system further comprises a vehicle lift device for transfer of at least one of the vehicles between the first track system and the second track system. The number of vehicles to be transferred between the first and second track systems may be determined according to need. The vehicle lift device comprises a support and transport platform arranged to carry the vehicle and a lift mechanism arranged to move the platform. The lift mechanism is arranged to move the support and transport platform between a first lift stop position and a second lift stop position. In the first lift stop position, access is established between the platform and the first track system for enabling relocation of the vehicle between a support position on the platform and an operative position on the first track system. In the second lift stop position access is established between the platform and the second track system for enabling relocation of the vehicle between a support position on the platform and an operative position on the second track system.

The relocation of the vehicle between the support position on the platform and the operative position on the first or second track system include moving the vehicle from the platform to the track system and vice versa; moving the vehicle from the track system on to the platform. These moving patterns of the vehicle will of course depend on the vehicles arrival or departure to and from the first track system and second track system.

By the arrangement of the vehicle lift device, the vehicles are to be efficiently transported between track systems that are vertically displaced relative each other, thereby expanding the capacity of the automated storage and allowing for utilizing unused storage space in a storage facility and also providing for an efficient utilization of available vehicles.

The invention also concerns a method of operating the automated storage and retrieval system comprising the steps of:

moving a vehicle from the first track system on to the platform when the platform is arranged in the first lift stop position, moving the platform into a second lift stop position enabling access between the platform and the second track system, moving the vehicle from the supported position on the platform and on to the second track system.

For the transfer of a vehicle from the second track system to the first track system, similar method steps will be carried out; moving the vehicle from the second track system on to the platform when the platform is arranged in the second lift stop position, thereafter displacing the platform into a first lift stop position enabling access between the platform and the first track system and then moving the vehicle from the supported position on the platform and on to the first track system.

The platform may be present at the track system when the vehicle is ready for departure, or the platform needs to be moved into a position to enable access between the platform and the track system. If the platform is occupied by another vehicle, the occupying vehicle needs to be moved away from the platform, before moving the vehicle on to the platform.

For the movement of the platform, the step of selecting the first lift stop position or the second lift stop position may first be carried out, then it may be necessary to ensure the position of the platform in accordance with the selected lift stop position. The vehicle is now ready to be moved on to the platform, and the platform is moved into the other of the first lift stop position and the second lift stop position, thereby enabling access between the platform and the belonging track system. The vehicle is now ready to be moved from the platform and on to the belonging track system.

The transport/movement/displacement of the platform by the lift mechanism from the first lift position to the second lift position may be inclined relative to the horizontal plane, i.e. with a substantial horizontal component. Alternatively, the transport may be purely vertical, i.e. having no substantial horizontal component.

The system may also include more than two track systems, in which case the additional track system(s) is vertically displaced relative to the two track systems and the vehicle lift device has a designated lift stop position for enabling access to the additional track system. And if there are more than one additional track systems, there may be a plurality of designated lift stop positions, each designated lift stop position enabling access to the respective additional track system.

The platform may typically be arranged for carrying one vehicle at the time, but it may also be arranged for carrying a plurality of vehicles at the same time. When the platform is arranged for a carrying plurality of vehicles at a time, it is of course possible to pick up an additional vehicle when stopping in a lift stop position, without the vehicle(s) already occupying the platform leaving first, given that not all spaces available for carrying vehicles on the platform are occupied.

The first and second track systems may be located in proximity of each other/adjacent to each other when viewed from above or may be positioned further apart displaying a horizontal gap distance that needs to be covered for the transfer of vehicles between the first and second track system. If the system comprises more than two track systems, this same applies to at least two of the track systems that are included in the automated storage and retrieval system.

It may be advantageous that at least a part of an outer circumference, i.e. at least a part of the perimeter, of the first track system is in proximity, (adjacent or neighboring) of at least a part of an outer circumference/perimeter of the second track system when viewed horizontally/from above. For example, the perimeter of the first track system may be between one and ten storage cells from the second track system, and at least the size of the vehicle lift device. One storage cell may typically have a width within the interval of 30 to 150 cm and a length within the interval of 50 to 200 cm.

This horizontal positioning of the first and second track systems may be useful for utilizing adjoining storage spaces of storage facility. The horizontal displacement of the first and second track system should however allow the vehicle lift device to transport the vehicle from the from the first track system to the second track system and vice versa.

Further, in an advantageous configuration the lift mechanism may be configured for displacement of the platform in a vertical direction between the first lift stop position and the second lift stop position. If the system comprises more than two track systems, the number of lift stop positions corresponds to the number of track systems and the displacement of the platform may then occur in a vertical direction between the lift stop positions designated for access to the additional track system(s).

When the track systems, such as first and second track systems are located proximate each other or in neighboring horizontal positions when viewed from above, the vertical distance between the track systems is efficiently covered by the displacement of the platform in a vertical direction, and the vehicles may arrive and depart more or less directly to and from operative position on the track systems. However, even if the track systems, are spaced somewhat apart horizontally, the lift mechanism may displace the transport and support platform in the vertical direction. Additional arrangement of a bridge or a structure extending from one or more of the track systems may then be included, to cover the horizontal gap distance in between the track systems.

The lift mechanism may alternatively be configured for displacing the platform in an inclined direction, having a substantial horizontal component, between the lift stop positions, thereby covering both the vertical gap distance between the first the track systems, as well as the horizontal gap distance in between the track systems.

As a further alternative to the vehicle lift device a bridge structure may be arranged connecting the track systems for the transfer of vehicles in between the track systems. A bridge structure may be especially suitable when the horizontal and the vertical gap distance between the track systems allow for an orientation of the bridge structure where the tilting angle of the bridge structure ensures the unobstructed moving of the vehicle(s) in between the track systems. If the constructional outlay of the storage facility allows, it may also be possible to arrange a bridge structure between the first and second track systems, even if horizontal gap distance between the track systems is minimized or the first and second track systems are located in neighboring positions when viewed horizontally.

In the situation where the vehicle is directly relocated between the platform of the vehicle lift device and the first or second track system only minimal tolerances with respect to misalignment between the support position on the platform and the operative position on the first or second track system are possible. Significant misalignment can result in the vehicle becoming derailed.

In order to ensure a safe accommodation of the vehicle when being transported by vehicle lift device, the platform may advantageously comprise a guiding and positioning structure configured for positioning and maintaining the vehicle in a motionless or near motionless position on the platform during the transfer between the first and second lift stop positions, or if more than two lift stop positions between these lift stop positions.

The guiding and positioning structure may advantageously be is adjacent and flush with the first track system when the guiding and positioning structure is placed in the first lift stop position for enabling relocation of the vehicle between the guiding and positioning structure and the first track systems and wherein the guiding and positioning structure is adjacent and flush with the with the second track system when the guiding and positioning structure is placed in the second lift stop position for enabling relocating of the vehicle between the guiding and positioning structure and the second track systems.

To ensure that the vehicle is kept safe on the platform during transport, a vertical support structure may also be arranged for support of the vehicle when the platform is displaced in the vertical direction between the lift stop positions.

In order to facilitate an unobstructed relocation between the track systems and the platform and possibly also to obtain a continuous movement of the vehicle during the relocation, the guiding and positioning structure may comprise a platform track arrangement.

The platform track arrangement may comprise either a set of parallel tracks extending in the direction X, which may be equal to the first direction X' and/or to the third direction X", or a set parallel tracks extending in the direction Y, which may be equal to the second direction Y' or fourth direction Y", being perpendicular to the direction X, or may comprise both these first and second sets of parallel tracks. Depending on the orientation of the tracks of the first and second track systems, which may be the same but may very well also vary, one of these suggested alternatives may be selected to fit with the orientation of both the tracks of the first and second track systems. The guiding and positioning structure may be configured such that the platform track arrangement is vertically leveled with the first track system when the guiding and positioning structure is placed in the first lift stop position, thereby enabling relocation of the vehicle between the platform track arrangement and the first track system. The guiding and positioning structure may also be configured such that the platform track arrangement is vertically leveled with the second track system when the guiding and positioning structure is placed in the second lift stop position, thereby enabling relocation of the vehicle between the platform track arrangement and the second track systems.

The selection of the platform track arrangement to include either a set of parallel tracks extending in the direction X or a set parallel tracks extending in the direction Y or both, may be made dependent on the location of the guiding and positioning structure as positioned along the outer circumference of the first and second track system. If the first lift stop position and second lift stop position are located at portions of the outer circumference extending in the same direction (X, X', X" or Y, Y', Y") both at the first track system and the second track system, the platform track arrangement then only needs a set of parallel tracks. For instance, when both the first and second lift stop positions are arranged at portions of the outer circumference of the first track system and the second track system extending in the X',X" direction, the vehicle will move on the set of parallel tracks extending in the Y',Y" direction when moving from the first track system and on onto the platform and from the platform and to the second track system. The platform track arrangement then needs a set of parallel tracks extending in the Y direction for receiving the vehicle from the first track system and letting the vehicle off at the second track system.

Likewise, if the lift stop positions are located at portions of the outer circumference extending in the Y direction, the platform track arrangement then needs a set of parallel tracks extending in the X direction for receiving the vehicle.

If the first and second lift stop positions are located at portions of the outer circumference of the first and second track system extending in different directions (one portion extending in X direction and the other extending in Y direction), the platform needs two sets of parallel tracks. For instance, the vehicle lift device may have a first lift stop position at the first track system at a portion of the outer circumference extending in the X direction, and a second lift stop position at the second track system at a portion of the outer circumference extending in the Y direction or vice versa. The platform track arrangement then needs both a first set of parallel tracks extending in the X direction and a second set of parallel tracks extending in the Y direction for moving the vehicle between the platform and the first and second tracks.

The guiding and positioning structure may be arranged as an integrated part of the platform or as an independent assembly to be mounted for instance in a releasable arrangement to the platform. If the guiding and positioning structure is releasably arranged to the platform, the replacement of the guiding and positioning structure is simple to carry out to fit the configuration of the guiding and positioning structure with configuration of the first and second track systems.

In another embodiment, when transporting the vehicle by the vehicle lift device, the vehicle may simply be resting on a support surface of the platform. Typically, the support surface will then have a horizontal orientation to maintain the vehicle in motionless or near motionless position during transfer. The guiding and positioning structure may then comprise a base plate structure which may be arranged with at least two side walls for receiving the vehicle in the area defined by the at least two side walls and the base plate structure, such that the guiding and positioning structure is adjacent and flush with the first track system when the guiding and positioning structure is placed in the first lift stop position for enabling relocation of the vehicle between the guiding and positioning structure and the first track systems and wherein the guiding and positioning structure is adjacent and flush with the with the second track system when the guiding and positioning structure is placed in the second lift stop position for enabling relocating of the vehicle between the guiding and positioning structure and the second track systems.

As an alternative to the side walls or in addition to the side walls, the base plate structure may comprise at least one first recess having an extent in the direction X for receiving at least one wheel of the wheel assembly which is arranged to guide movement of the vehicle in the direction X. Alternatively or in addition the guiding and positioning structure may comprise at least one second recess, having an extent in the direction Y for receiving at least one wheel of the wheel assembly arranged to guide movement of the vehicle in the direction Y. The first and second recess(es) may each typically have a configuration arranged for receiving one wheel each.

The number of recesses may be chosen dependent on the specific need for support during transport and varied in accordance with transport direction of the transported vehicle upon arrival and departure to and from the track systems. For instance, the number of recesses may be selected to correspond with the number of the total wheels of the wheel assembly or with the wheels guiding movement of the vehicle either in the X or Y direction. Alternatively, the guiding and positioning structure may comprise only one first recess for receiving one wheel of the wheel assembly arranged to guide movement of the vehicle in the first direction and/or one second recess for receiving one wheel of the wheel assembly arranged to guide movement of the vehicle in the second direction.

The number of recesses may of course also vary within a range, wherein the limits of the range is set by a single recess and a maximum number of recesses. The maximum number of recesses may for instance correspond to the number of wheels of the wheel assembly, or even a number of recesses exceeding the number of wheels. As an alternative the recess may have a configuration where more than one wheel is received in the recess. The recess may even be configured with an outer horizontal cross section which is equal or larger than the footprint of the vehicle. The footprint is defined as an extent of the vehicle in the direction X and the direction Y.

The system may further comprise a first storage container port for transferring the storage containers between the first track system and an access station and a plurality of first track system transfer columns located beneath the first track system for temporarily storing storage containers when in transit between the storage columns and the storage container port. At least one of the plurality of vehicles may then be a storage container vehicle and at least one of the plurality of vehicles will be a port access vehicle. The storage container vehicle is configured to transport the storage containers between the storage columns and the first track system transfer column. The port access vehicle is configured to transport the storage containers between the first tack system transfer columns and the first storage container port.

In addition to, or as an alternative to the first track system comprising the first storage container port, first access station and first transfer columns being located beneath the first track system, the second track system may be arranged with similar arrangement. The system may then further comprise a second storage container port for transferring the storage containers between the second track system and an access station and a plurality of second track system transfer columns located beneath the second track system for temporarily storing storage containers when in transit between the storage columns and the second storage container port. At least one of the plurality of vehicles may then be a storage container vehicle and at least one of the plurality of vehicles will be a port access vehicle. The storage container vehicle is configured to transport the storage containers between the storage columns and the second track system transfer column. The port access vehicle is configured to transport the storage containers between the second track system transfer columns and the second storage container port.

By these arrangements the possibilities for temporarily storing storage containers when in transit may be adapted according to the need, either by arranging the first transfer columns beneath the first track system only or by arranging the second transfer columns beneath the second track system only or by combination of the first and second transfer columns to provide shared temporarily storage.

When system comprises at least the port access vehicle and at least one storage container vehicle, both kind of vehicles may be transported by the vehicle lift device. If the system is arranged with transfer columns, storage container port and access station beneath only the first track system, the vehicle to be transported by the vehicle lift device is preferably the storage container vehicle which carries storage containers from the second track system for further handling in transit by first track system transfer column before delivery to the first storage container port. And similar if the system is arranged with transfer columns, storage container port and access station beneath only the second track system, the vehicle to be transported by the vehicle lift device is preferably the storage container vehicle which carries storage containers from the first track system for further handling in transit by second track system transfer column before delivery to the second storage container port. However, if the arrangement for temporary storage is shared between the transfer columns arranged beneath the first and second track systems, both the storage container vehicle and the port access vehicle may be transferred between the first and second track systems by the vehicle lift device for the efficient handling of the storage containers.

As mentioned previously the automated storage and retrieval system may also include more than two track systems, for instance a third track system. The system may comprise three, four, five etc. track systems which are arranged vertically displaced relative each other, and the vehicle lift device has a designated lift stop position for enabling access to the respective additional track system; a third lift stop position for gaining access to a third track system, a fourth lift stop position for gaining access to a fourth track system etc. Thus, the system may comprise a third track system comprising a fifth set of parallel tracks arranged in a third horizontal plane (P3) and extending in a fifth direction (X'''), and a sixth set of parallel tracks arranged in the third horizontal plane (P3) and extending in a sixth direction (Y''') which is orthogonal to the first direction (X'''), which fifth and sixth sets of tracks form a grid pattern in the third horizontal plane (P3) comprising a plurality of adjacent grid cells. Each grid cell comprises a grid opening defined by a pair of neighboring tracks of the fifth set of tracks and a pair of neighboring tracks of the sixth set of tracks; a plurality of stacks of storage containers may be arranged in the storage columns located beneath the third track system. Each storage column is located vertically below a grid opening;

wherein the third horizontal plane (P3) is vertically displaced relative the first horizontal plane (P1) of the first track system and/or second horizontal plane (P2) of the second track system. The lift mechanism is arranged to move the platform between the first lift stop position, the second lift stop position and a third lift stop position, and in the third lift stop position establishing access between the platform and the third track system for enabling relocation of the vehicle between a support position on the platform and an operative position on the third track system.

The first and third track systems may be arranged with a horizontal gap distance, when viewed from above, in between the track systems, the horizontal gap distance may be arranged to accommodate the vehicle lift device between the tracks systems or the gap distance may be minimized. At least a part of an outer circumference/perimeter of the third track system may be arranged in proximity or neighboring at least a part of an outer circumference/perimeter of the first track system. The at least a part of an outer circumference/perimeter of the third track system may also be in proximity or neighboring at least a part of an outer circumference/perimeter of the second track system. Alternatively, at least a part of an outer circumference/perimeter of the third track system may be in proximity or neighboring only at least a part of an outer circumference/perimeter of the second track system. As mentioned above, two track systems may be in proximity or neighboring if the separation in the horizontal plane is less than 10 storage cells, for example less than 5 storage cells.

A possible fourth, fifth, sixth track systems as included in the automated storage and retrieval system may also be arranged with the features as defined for the first and second track systems. The vehicle lift device including the arrangement of the lift mechanism, configurations of the guiding and positioning structure may be arranged to fit with the belonging lift stop positions of the fourth, fifth, sixth etc. track systems. These track systems may be arranged with transfer columns, storage container ports and may comprise at least one storage container vehicle and at least one port access vehicle as previously described. Further two or more of the track systems included in the automated storage and retrieval system may be located proximate such as in a neighboring arrangement or distanced from each other in various configurations for instance to fit the automated storage and retrieval system into the outlay of available storage space.

The automated storage and retrieval system in accordance with the invention may be installed in a storage facility to effectively occupy available storage space of a storage facility, especially in a storage facility where the ceiling height of the storage spaces varies.

The invention also concerns a storage facility comprising the automated storage and retrieval system as defined herein. The storage facility comprises a first storage space for accommodation of the first track system and a second storage space for accommodation of the second track system. The second storage space being horizontally shifted relative to the first storage space, wherein a minimum inner ceiling height of the storage facility for accommodating the first storage space is higher than a minimum inner ceiling height for accommodating the second storage space.

The storage facility may also comprise a third storage space for accommodation of the third track system, the third storage space being horizontally shifted relative to the first storage space. A minimum inner ceiling height the first storage space may be arranged higher than a minimum inner ceiling height of the third storage space.

By the arrangement of the track systems in the storage facility occupying the available storage spaces, the track systems have been made accessible for the number of vehicles available for operating the automated storage and retrieval system. The storage spaces housing the track systems may have a ground floor on same or different horizontal levels, and the storage spaces may be adjoining spaces or storage spaces arranged separately by accessible by the vehicle lift device.

The number of track systems may be set in accordance with the constructional outlay of the storage facility and may in accordance with previous descriptions comprise more than two track systems. Two and two track systems which are vertically displaced may then be made accessible for the vehicles by the vehicle lift device, making up a row of track systems. The track systems may also be arranged in a group with one tracks system being appointed a main track system, and each additional track system may be paired with the main track system by a vehicle lift device. These two different configurations of track systems arranged in a row and in a group, may also be assembled in various configurations connected by a vehicle lift device.

The term track should be interpreted as being the same as rails.

The term vehicle should be interpreted as being a storage container handling vehicle.

In the following, numerous specific details are introduced by way of example only to provide a thorough understanding of embodiments of the claimed system and method. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

BRIEF DESCRIPTION OF THE DRAWINGS

Following drawings are appended to facilitate the understanding of the invention.

FIG. 5 is a top view of grid of an automated storage and retrieval system.

In the drawings, like reference numerals have been used to indicate like parts, elements or features unless otherwise explicitly stated or implicitly understood from the context.

DETAILED DESCRIPTION OF THE INVENTION

Figure 1:
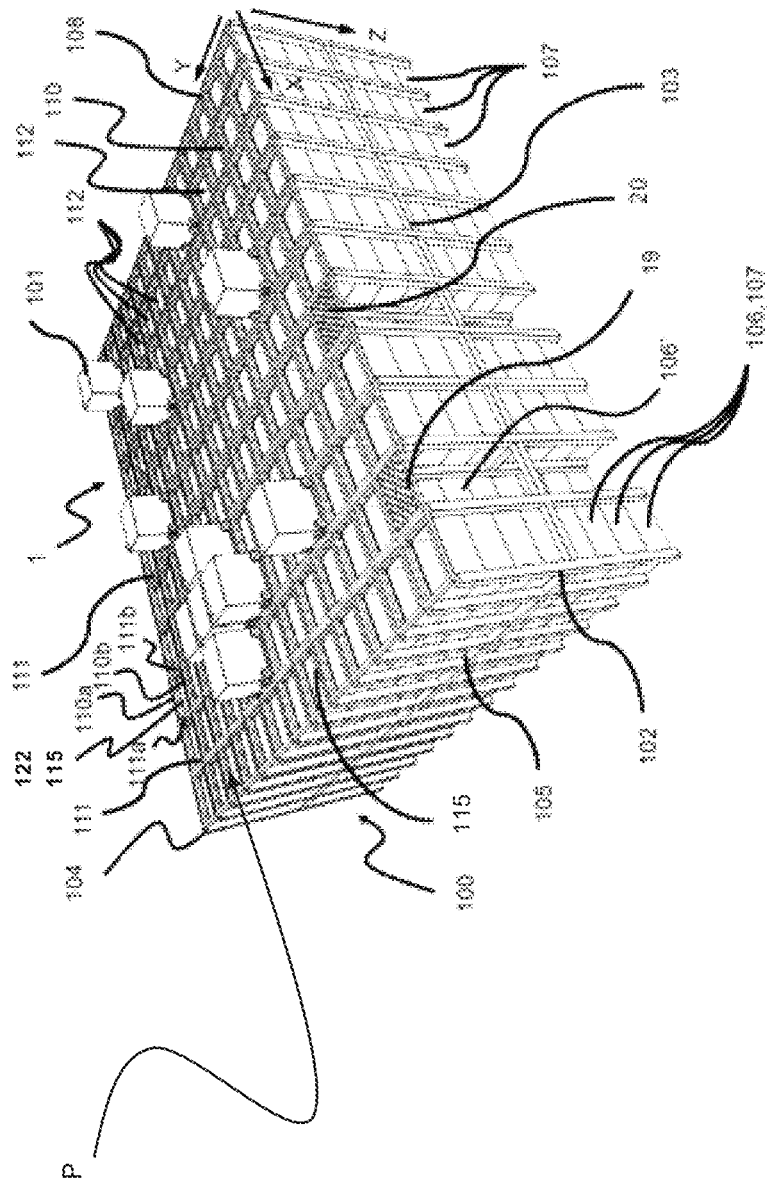
FIG. 1 is a perspective view of a grid of a prior art automated storage and retrieval system.

In the following, embodiments of the invention will be discussed in more detail with reference to the appended drawings. It should be understood, however, that the drawings are not intended to limit the invention to the subject-matter depicted in the drawings.

Particular embodiments of a storage structure of an automated storage and retrieval system 1 are shown in FIGS. 7-20.

FIG. 1 shows the storage grid 104 of each storage structure which constitutes a framework 100 which may for example comprise a total of 1800 grid columns 112, where the width and length of the framework corresponds to the width and length of 36 and 50 grid columns 112, respectively. The top layer of the framework 100 is a track system 108 onto which a plurality of vehicles 3,101 are operated.

FIG. 5 shows two types of vehicles 3,101, indicated by black and light grey rectangles. The black rectangles symbolize exemplary positions of container handling vehicles 101 intended to transport storage containers (not shown) to and from their respective grid columns 112 within the framework 100 (white area), while light grey rectangles symbolize exemplary positions of port access vehicles 3 intended to transport the picked storage containers between temporary storage positions within a transfer zone 35 of the framework 100 (dark grey area) and a port zone 26 containing one or more container ports 19-21 (area framed by a dotted circle).

In the embodiment disclosed in FIG. 5, the framework 100 comprises a storage zone 25, two port zones 26 and two transfer or buffer zones 35. The size and number of the transfer zones 35 and port zones 26 may vary according to need. While the size and position of the port zones 26 normally are fixed, the size and position of the transfer zones 35 may be dynamic and set by the software controlling the storage container vehicles 101 and/or the port access vehicles 3. The grid columns constituting the transfer zone 35 has preferably the same dimensions as the grid columns constituting the storage zone 25. Alternative solutions may of course be envisaged such as special grid cells within a transfer zone 35 being only one cell deep (Z=1) or a transfer zone 35 where the storage containers may be placed only on top (Z=0) of the track system 108.

In the example shown in FIG. 5, the framework 100 comprises a storage zone 25 (white area), two port zones 26 (areas enclosed by dotted circles) and two transfer zones 35. Each port zone 26 is for example three grid cells wide in the X direction and two grid cells long in the Y direction, as for the left port zone, or three grid cells wide in the X direction and one grid cell long in the Y direction, as for the right port zone. Each port zone 26 comprises ports 19-21 where storage containers can be transferred out of or into the framework 100 or transported to an access station 32. The left transfer zone 35, linked to the left port zone 26, is three grid cells wide in the X direction and 41 grid cells long in the Y direction, while the right transfer zone 35, linked to the right port zone 26, is three grid cells wide and 42 grid cells long. The storage zone 25, which makes up the rest of the framework 100, comprises storage columns 105 in which storage containers 106 or bins can be stacked one on top of another to form stacks 107.

If not otherwise stated, the framework 100 of the automated storage and retrieval system 1 is constructed in accordance with the prior art framework 100 described above in connection with FIG. 1, i.e. a plurality of upright members 102 and a plurality of horizontal members 103 which are supported by the upright members 102, and further that the horizontal members 103 comprise the track system 108 of parallel tracks 110,111 in the X direction and the Y direction arranged across the top of storage columns 105/grid columns 112. The horizontal area of a grid column 112, i.e. along the X and Y directions, may be defined by the distance between adjacent tracks 110 and 111, respectively.

Consequently, the track system 108 allows the container handling vehicles 101 and the port access vehicles 3 to move horizontally between different grid locations, where each grid location is associated with a grid column 112. The port access vehicle 3 may be restricted to move in the X direction only, or may be configured to move both in the X direction and in the Y direction, hence having the same mobility on the track system 108 as the container handling vehicle 101.

In FIG. 1 the grid 104 is shown with a height of eight cells. It is understood, however, that the grid 104 in principle can be of any size. In particular, it is understood that grid 104 can be considerably wider and/or longer than disclosed in FIG. 1 For example, the grid 104 may have a horizontal extension of more than 700×700 grid cells. Also, the grid 104 can be considerably deeper than disclosed in FIG. 1. For example, the grid 104 may be more than twelve grid cells deep.

Figure 2A:
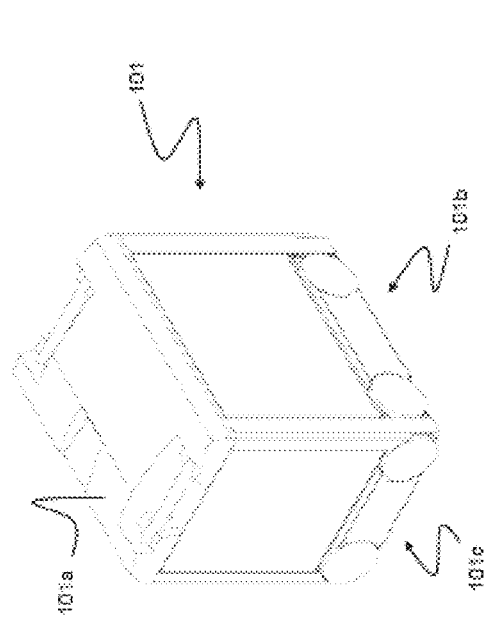
FIG. 2A and FIG. 2B are a perspective views of prior art container handling vehicles.
Figure 2B:
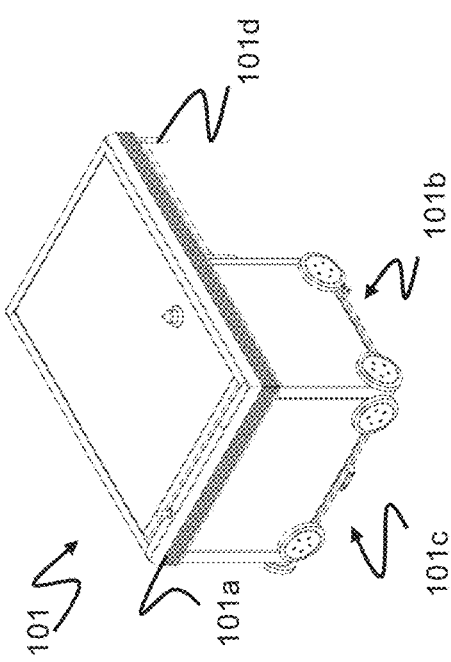

The storage container vehicles 101 may be of any type known in the art, e.g. any one of the automated container handling vehicles disclosed in WO2014/090684 A1, in NO317366 or in WO2015/193278A1 (FIGS. 2A and B). In the embodiments shown in FIG. 5 the storage container vehicles 101 of the type disclosed in WO2015/193278A1 is assumed, i.e. storage container vehicles 101 displaying a centrally located storage space for receiving and stowing a storage container (not shown) and for transporting a storage container horizontally across the grid 104, and a footprint, i.e. an extent in the X and Y directions which is generally equal the horizontal extent/area of a grid column 112. This particular configuration will allow a storage container vehicle 101 to transport a storage container above a row of grid columns 112 even if another storage container vehicle occupies a location above a grid column neighboring the grid column row along which the first storage container vehicle 101 is traveling.

Port access vehicles 3 are operated above the grid 104 for transferring storage containers between the transfer zones 35 and the port zones 26. As will be discussed in more detail in the following, each port access vehicle 3 is arranged to transfer storage containers above the operating plane of the container handling vehicles 101, i.e. in a plane above the operating space of the container handling vehicles 101, thus allowing the port access vehicle 3 to transfer a storage container over a drop-off or pick-up transfer column 36, 37 even if a container handling vehicle 101 occupies the grid location above that drop-off or pick-up transfer column 36, 37. Consequently, container handling vehicles 101 can be dropping off or picking up storage containers from drop-off or pick-up transfer columns 36, 37 while the port access vehicle 3 simultaneously transfers other storage containers between the transfer zone 36 and the port zone 26 above the container handling vehicles 9.

Figure 6:
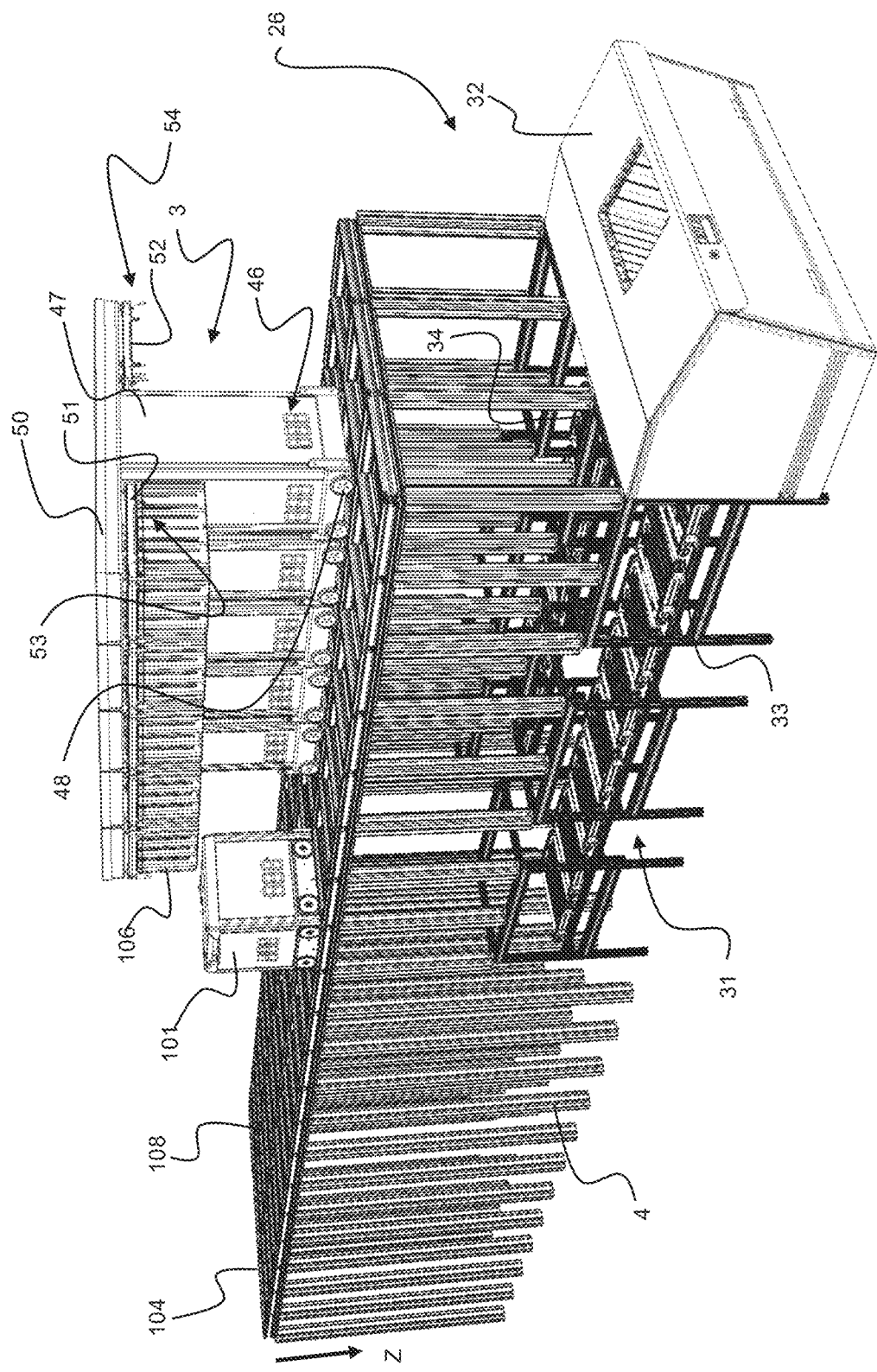
FIG. 6 is a perspective view of an example of a port access vehicle.

An example of the port access vehicle 3 is shown in FIG. 6. The port access vehicle 3 operates along the storage columns in row 40 (cf. FIG. 5), i.e. along a row of storage columns which extends into the grid from the port zone 26. The port access vehicle 3 may comprise a plurality of vehicle sections 46 which are connected in a train-like configuration, i.e. end-to-end. Each vehicle section 46 comprises a vehicle body 47 which has a footprint which generally corresponds to the lateral area of a grid column 12, thus allowing the port access vehicle 3 to pass between container handling vehicles 101 which are dropping off or picking up storage containers in the transfer zone. At the lower end of the vehicle body 47, a set of wheels 48 is mounted and configured to allow the vehicle section 46 to travel on the rail system 8 in the Y direction along row 40.

In the train of vehicle sections 46 making up the port access vehicle 3, the set of wheels 48 of at least one the vehicle sections 46 is motorized in order to propel the port access vehicle 3.

The vehicle section 46 comprises a horizontal bar or frame 50 which is mounted to the top of the vehicle body 47 and extends horizontally from both sides of the vehicle body 47 orthogonal to the dedicated direction of travel of the vehicle section 46, which dedicated direction of travel is defined by the set of wheels 48. In other words, when in operation on the grid 4, the horizontal bar 50 extends in the X direction (e.g. cf. FIG. 6). On both sides of the vehicle body 47, the horizontal bar 50 supports a container lifting and holding device 53, 54. Each lifting and holding device 53, 54 comprises a container gripping device 51, 52, which can be lowered from the horizontal bar 50 to grip and hold a storage container. The gripping devices 51, 52 can be individually lowered to pick up and drop off storage containers independently of each other.

The lifting and holding devices 53, 54 are arranged to hold storage containers in a raised, holding position when the port access vehicle transports the storage containers 106 between the transfer zone and the port zone. The vehicle body 47 of the vehicle sections 46 has a vertical extension which is sufficient to allow the lifting and holding devices 53, 54 to hold the storage containers 106 in a holding position which is above the operating space of the container handling vehicles as shown in FIG. 6.

Figure 11:
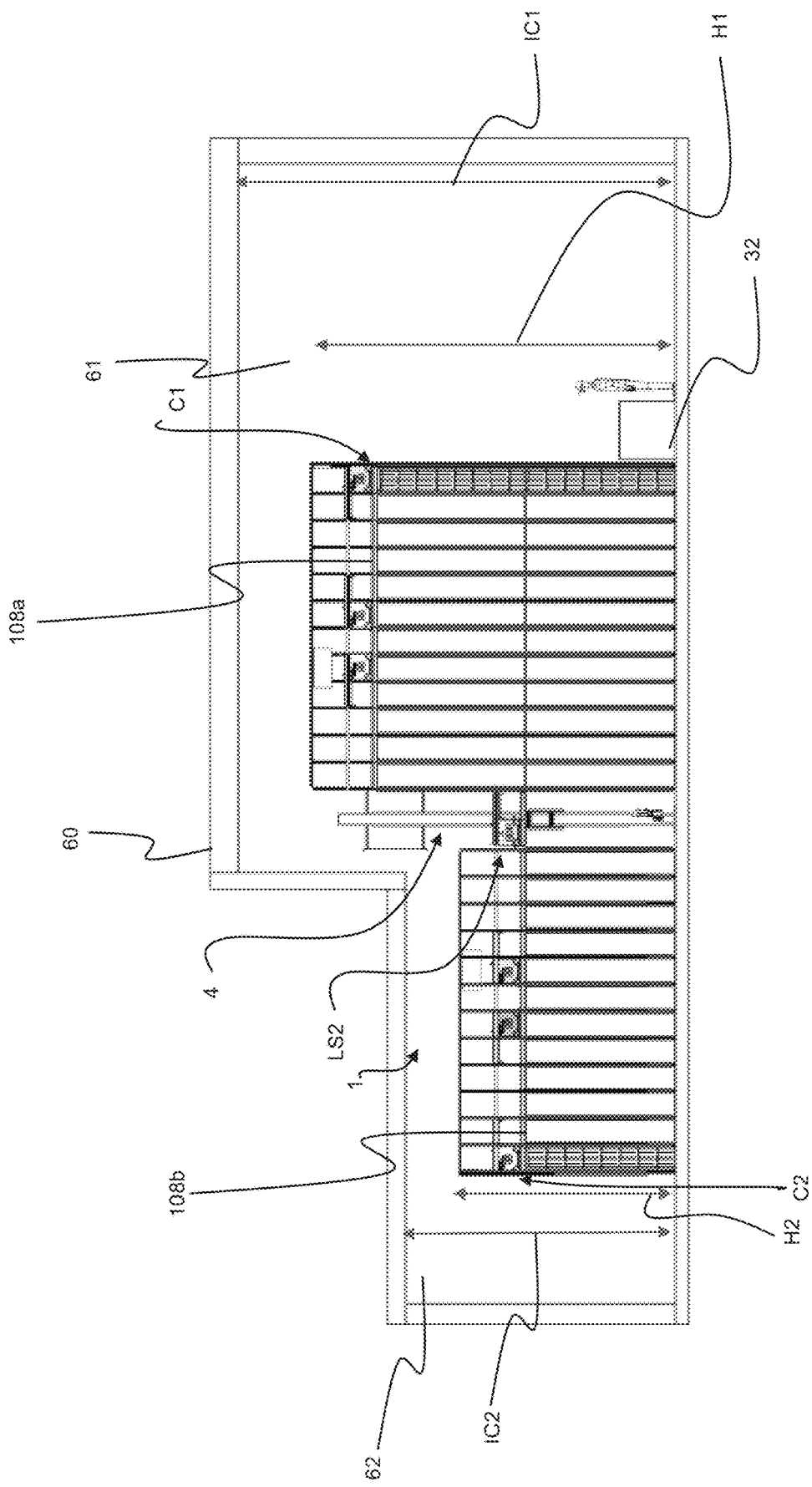
FIG. 11 is a side view of the automated storage and retrieval system of FIG. 7-10 located in a storage facility.

FIGS. 7-10 shows an example of the automated storage and retrieval system installation in accordance with an embodiment of the invention, and FIG. 11 shows the automated storage and retrieval system 1 located in a storage facility 60.

Figure 3:
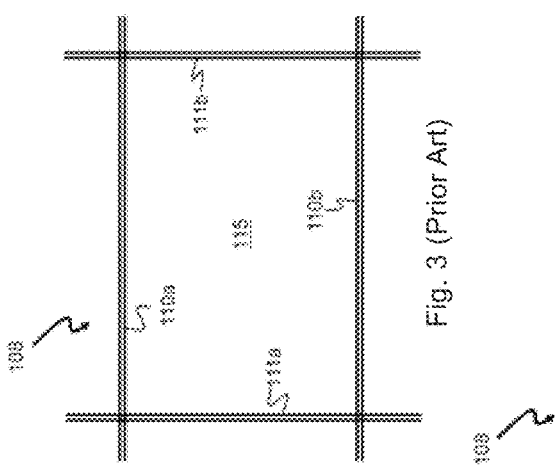
FIG. 3 is a top view of a prior art single rail grid.
Figure 4:
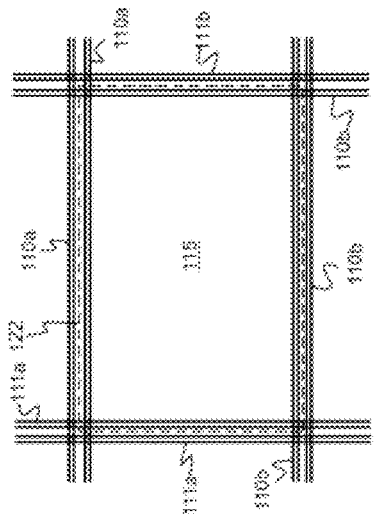
FIG. 4 is a top view of a prior art double rail grid.

FIGS. 7-10 shows first and second track systems 108a, 108b. Each of the first and second track systems 108a, 108b has a configuration and build-up similar to the system as shown in FIGS. 1, 3 and 4. The specifics of the first and second track systems 108a, 108b and belonging storage columns are thus not further described in reference to FIGS. 7-11, and for further details of these systems reference is made to FIG. 1, 3-4. The first track system 108a is arranged in a first horizontal plane P1 and the second track system 108b is arranged in a second horizontal plane P2. The first and second horizontal plane P1, P2 are vertically displaced relative each other.

The first and second track systems 108a, 108b are arranged to be accessible by a vehicle lift device 4 as illustrated for the transfer of vehicles 101 in between the track systems 108a, 108b. The vehicle lift device 4 has a support and transport platform 5 which is arranged to be moved between a first lift stop position LS1 and a second lift stop position LS2 by means of a lift mechanism 6. A vertical support structure 13 is arranged to ensure that the vehicle is kept on the support and transport platform 5 while being transported between first lift stop position LS1 second lift stop position LS2. The vertical support structure 13 is sized to ensure that the vehicle is kept safely on the support and transport platform 5 during this transport. The vertical support structure 13 may be arranged as a plate structure having a longitudinal extension in the vertical direction between the first and second track systems 108a, 108b, and a width direction in the first direction X when the vehicle lift device is positioned on the side of the first and second track systems 108a, 108b extending in the first direction X. And correspondingly when the vehicle lift device 4 is positioned on the side extending in the second direction Y, the width direction of the vertical support structure 13 may extend in the second direction Y.

Figure 7:
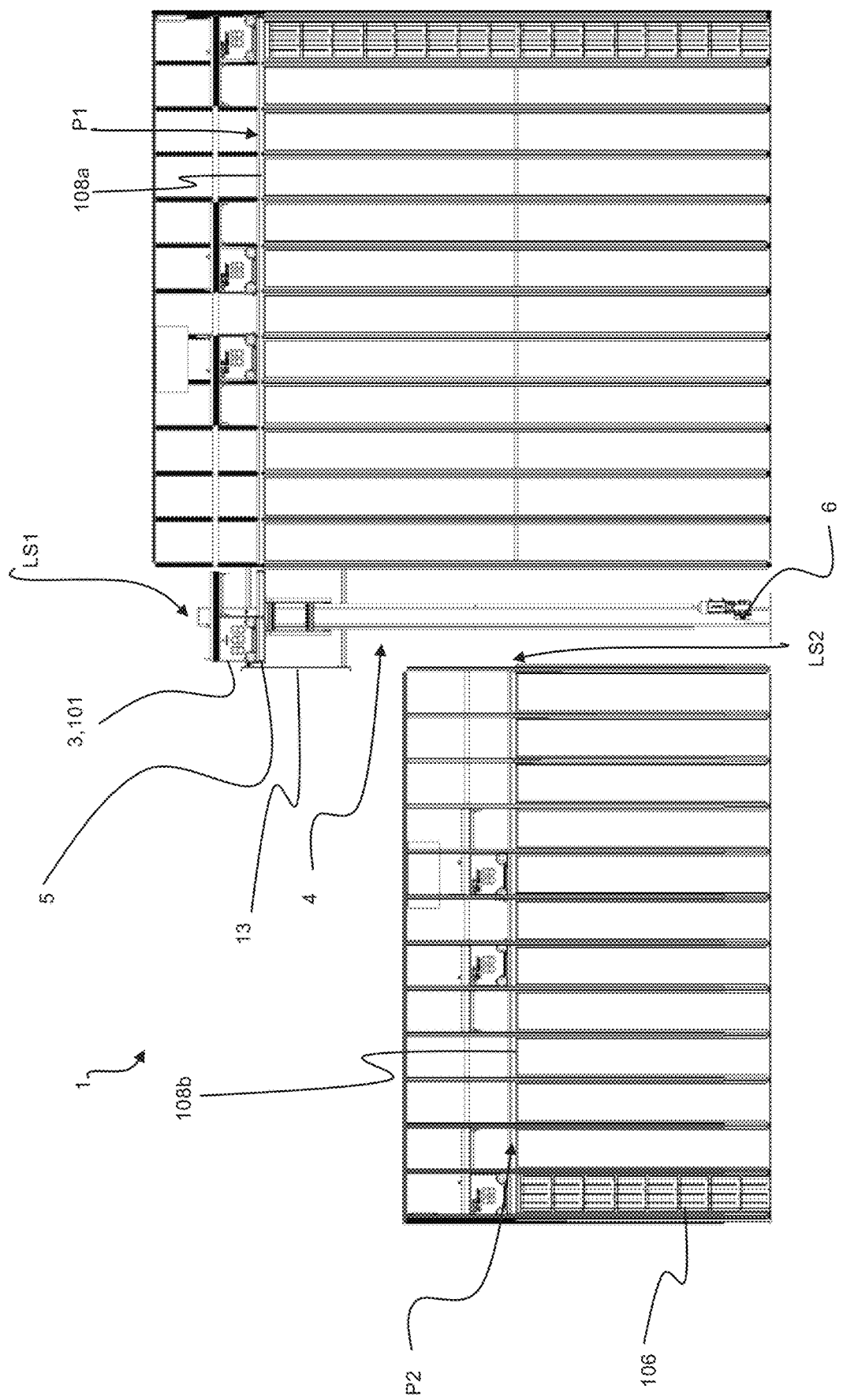
FIG. 7 is a side view of an automated storage and retrieval system according to an exemplary embodiment of the present invention with a vehicle lift device in a first lift stop position.
Figure 8:
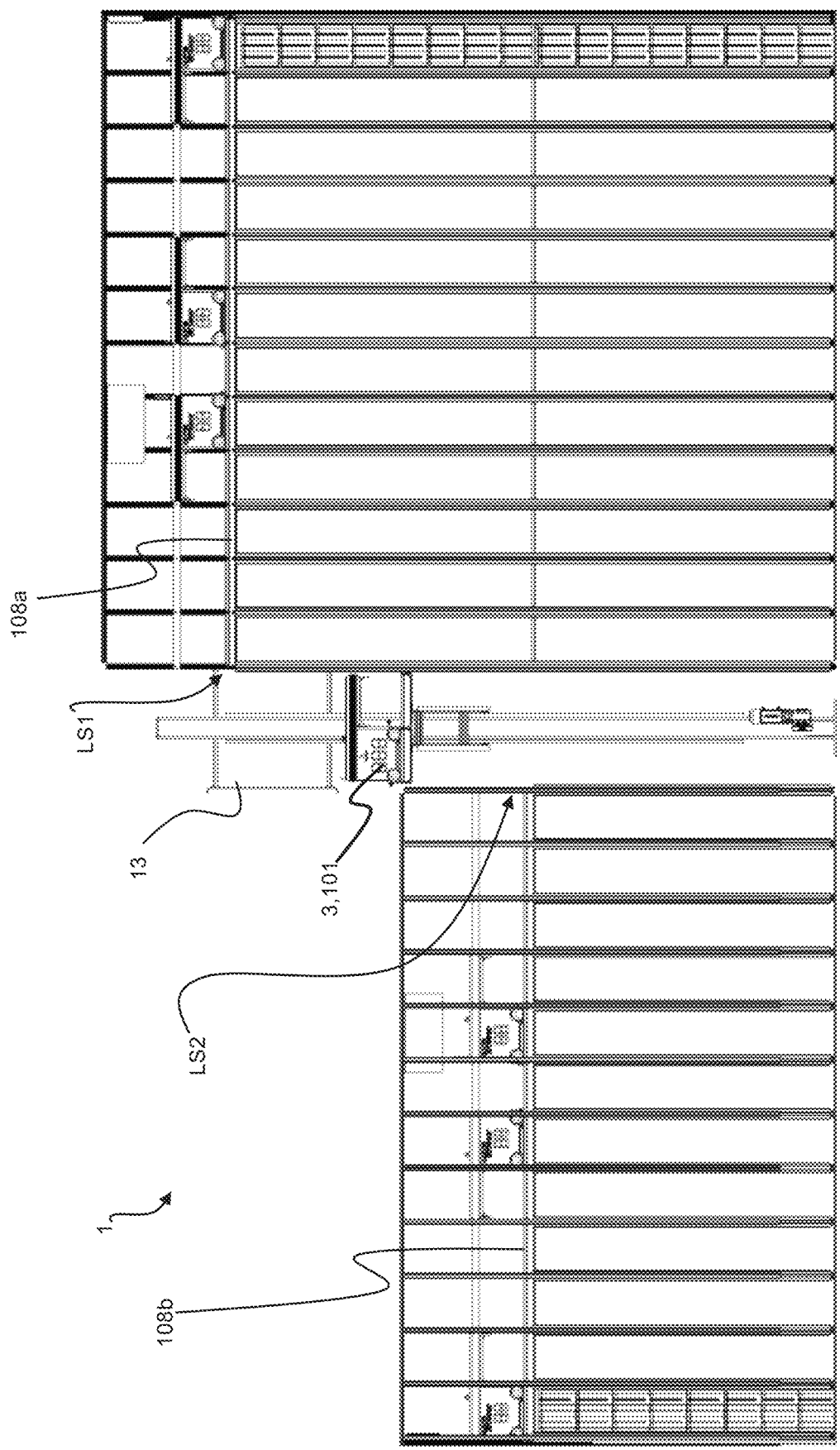
FIG. 8 is a side view of an automated storage and retrieval system according to an exemplary embodiment of the present invention with the vehicle lift device in between the first lift stop position and a second lift stop position.
Figure 9:
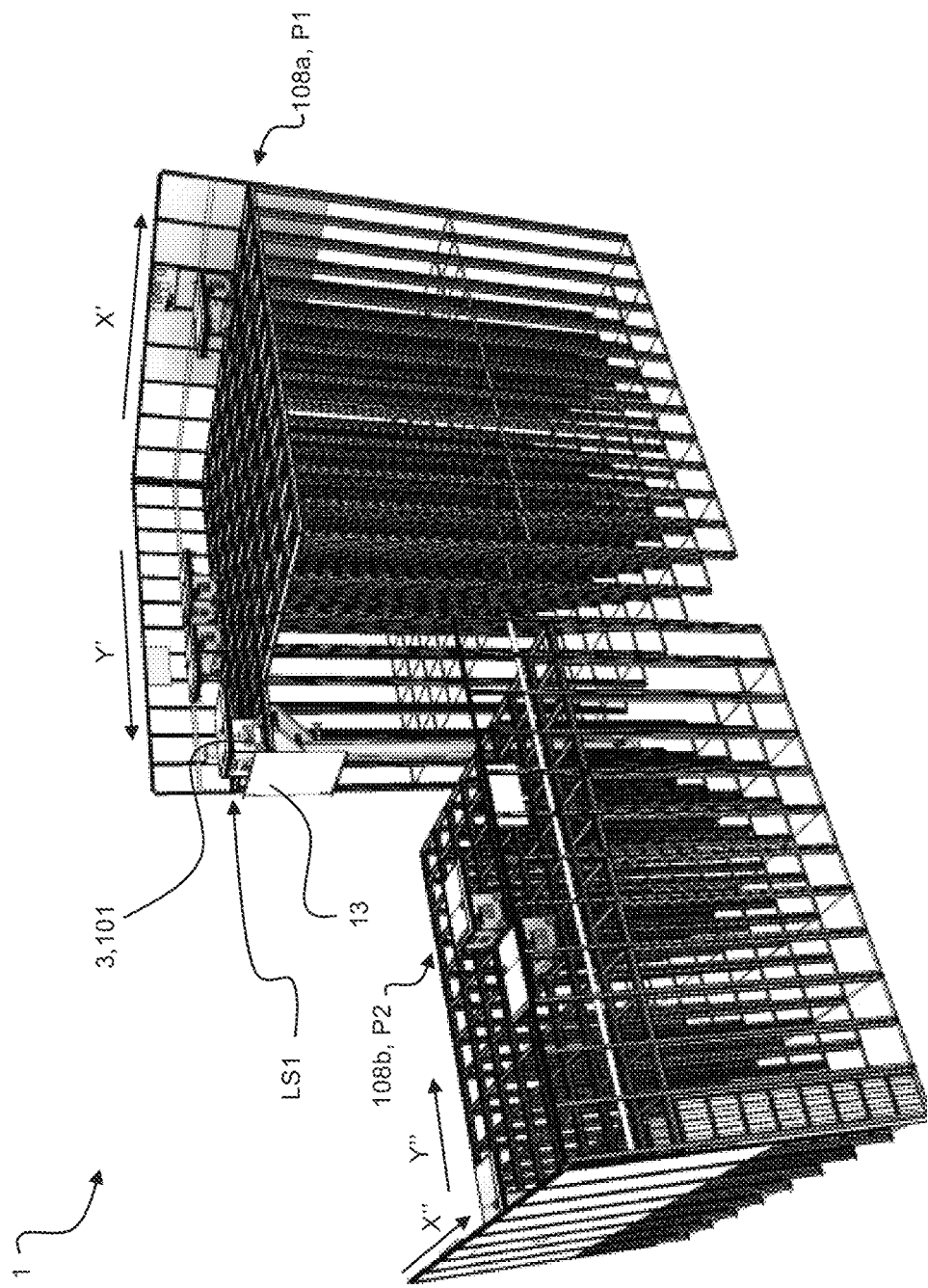
FIG. 9 is a perspective view of the automated storage and retrieval system of FIG. 7.
Figure 10:
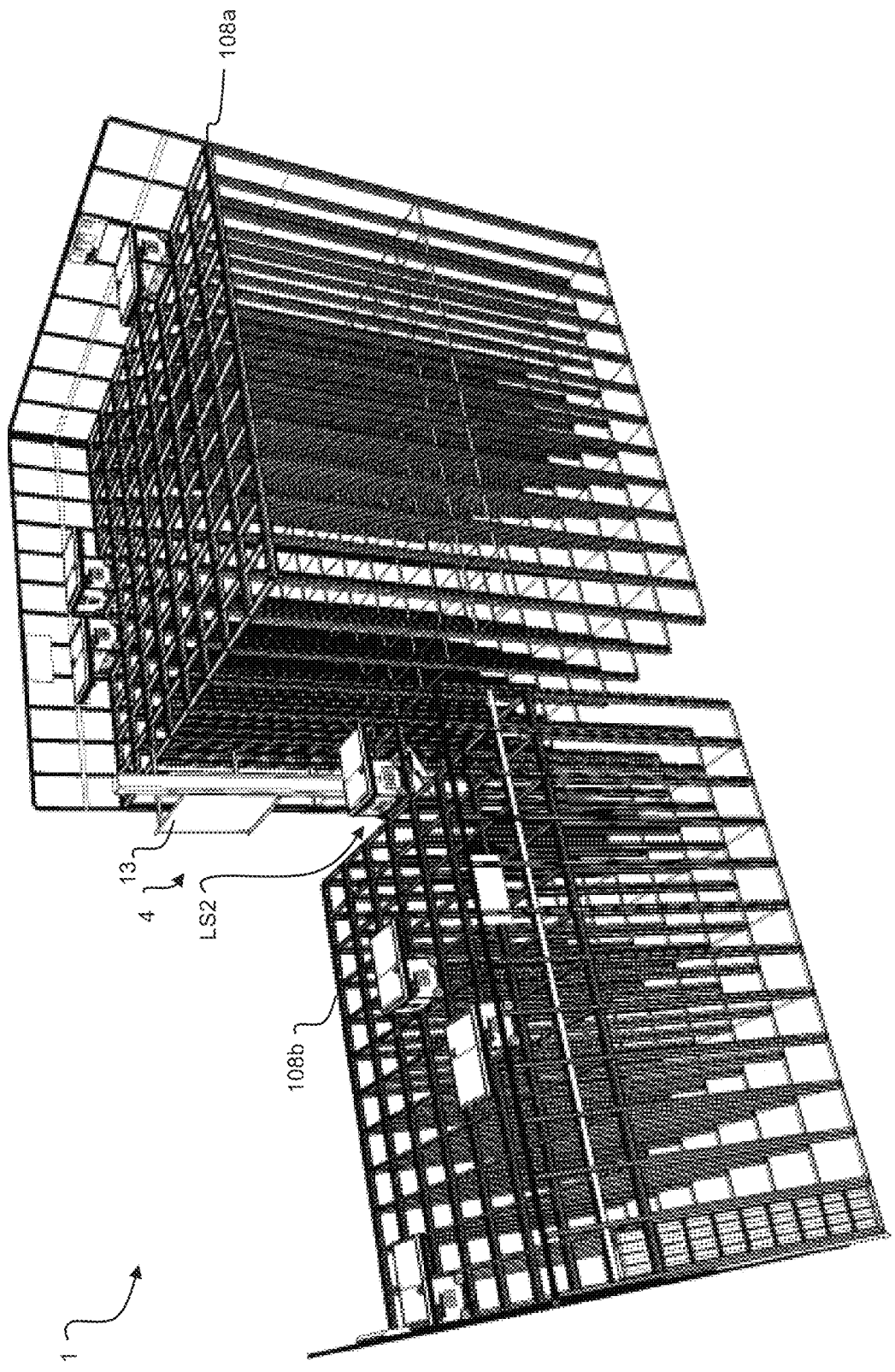
FIG. 10 is a perspective view of the automated storage and retrieval system of FIG. 8.

The vehicle lift device 4 as illustrated in FIG. 7-11 is arranged to move in the vertical direction when transferring the vehicles in between the first and second track systems 108a, 108b, but the movement of the vehicle lift device 4 may of course alternatively be inclined relative to the horizontal plane, i.e. with a substantial horizontal component, depending on the horizontal gap between the first and second track systems 108a, 108b. The vehicle lift device 4 shown in FIG. 7 is arranged to transfer the container handling vehicles 101, and may also transfer the port access vehicle 3 between the first and second track systems 108a, 108b, see FIG. 6 for illustration of a port access vehicle 3.

When the first and second track system 108a, 108b are located proximate/adjacent to each other as illustrated, the vehicle lift device 4 may have a purely vertical orientation and if the first and second track system 108a, 108b are spaced further apart from each other, the vehicle lift device 4 may have a slanted orientation, where the support and transport platform 5 would make an inclined moving path covering the vertical and horizontal gap (not shown) between the first and second track systems 108a, 108b. Preferably the support and transport platform 5 is configured to maintain the vehicle 3,101 horizontally leveled during the transport sequence between the first and second track systems 108a, 108b. The vehicle lift device 4 is shown located in-between the first and second track system 108a, 108b, but may also be placed occupying a space within the storage columns for instance in a shaft, for instance two storage columns. The vehicle lift device 4 may be located so that parts of the outer perimeter of the first and second track system 108a, 108b coincide (not shown).

In the first lift stop position LS1 the support and transport platform 5 is positioned to establish access between the support and transport platform 5 and the first track system 108a. In the first lift stop position LS1 the container handling vehicle 101 or the port access vehicle 3 is allowed to move between a support position on the support and transport platform 5 and an operative position on the first track system 108a. This operation includes moving the vehicle 3,101 from the first track system 108a on to the support and transport platform 5 or vice versa moving the vehicle 101 from the support and transport platform and to first track system 108a. When transferring the vehicle 3,101 from the first track system 108a to the second track system 108b, the vehicle 3,101 is first moved from the first track system 108a on to the support and transport platform 5 of the lift device 4, then the support and transport platform 5 is moved into the second lift stop position LS2 and then the vehicle 3,101 is moved from the supported position on the support and transport platform 5 on to the second track system 108b.

A similar sequence of operations is carried out when moving the vehicle 3,101 from second track system 108b to the first track system 108a. The vehicle is first moved from the second track system 108b on to the support and transport platform 5, then the support and transport platform 5 is moved into the first lift stop position LS1 and then the vehicle 3,101 is moved from the supported position on the support and transport platform 5 on to the first track system 108a.

When the vehicle 3,101 is transferred from the second track system 108b to the first track system 108a or from the first track system 108a to the second track system 108b, the vehicle leaves the support and transport platform 5 upon arrival at the destination (i.e. the first track system 108a or the second track system 108b). The empty support and transport platform 5 is now ready for receiving another vehicle at this destination, or the support and transport platform 5 may return empty. The vehicle lift device 4 is preferably arranged to carry one vehicle at a time, but may also be prepared for carrying plural vehicles.

Figure 12:
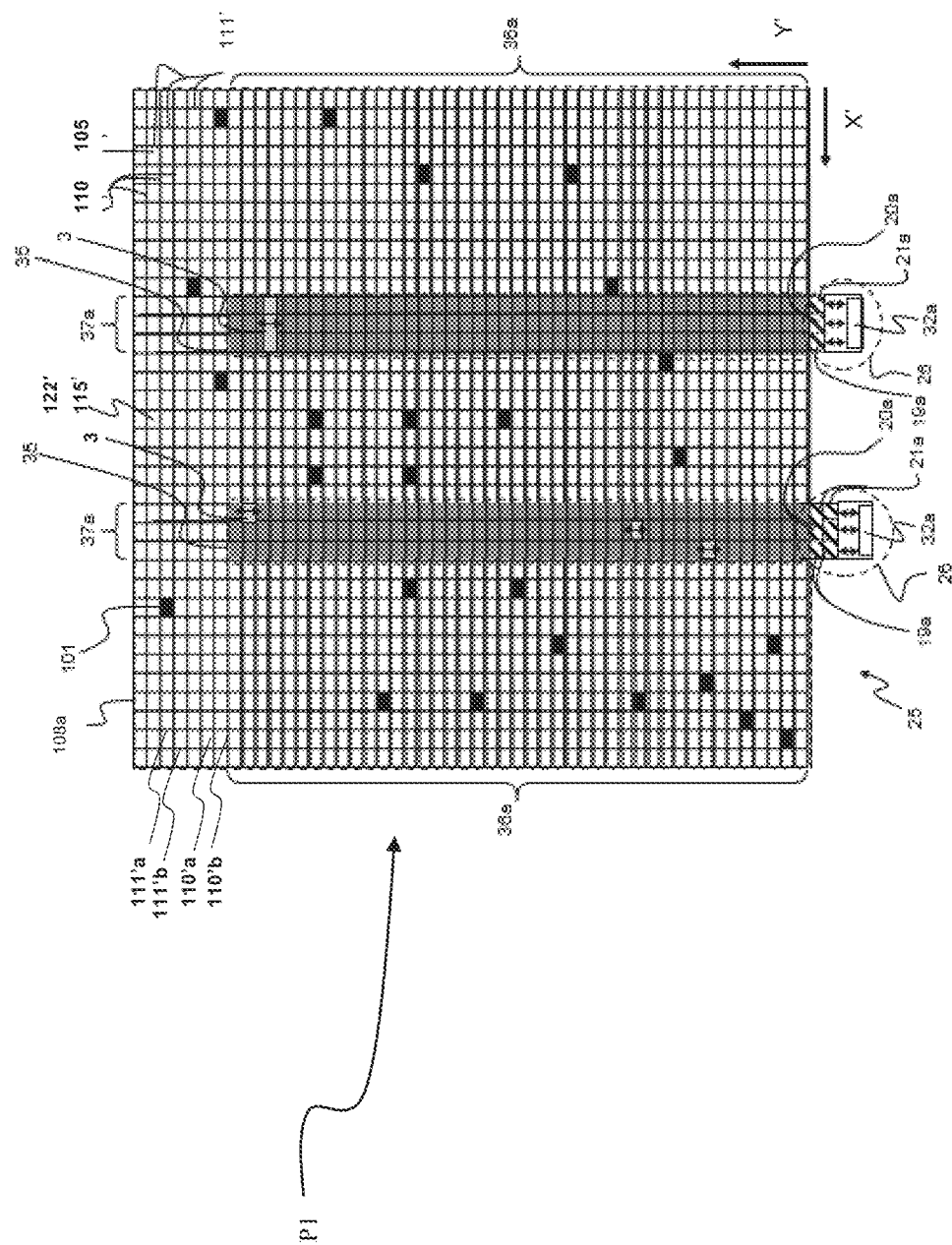
FIG. 12 is a top view of grid of an automated storage and retrieval system showing the first track system as illustrated in FIGS. 7-11.

FIG. 12 shows the how the first track system 108a may be prepared for the temporary storage of storage containers by arranging transfer columns 36a, 37a beneath the first track system 108a. A first access station 32a is also illustrated beneath the first track system 108a. Further, storage container port(s)/port column(s) 19a, 20a is arranged for transferring the storage containers 106 between the first track system 108a and a first access station 32a by the port access vehicle 3.

The black rectangles symbolize exemplary positions of container handling vehicles 101 intended to transport storage containers (not shown) to and from their respective grid columns 112 within the framework (white area), while light grey rectangles symbolize exemplary positions of port access vehicles 3 intended to transport the picked storage containers between temporary storage positions within a transfer zone 35 of the framework (dark grey area) and a port zone 26 containing one or more container port columns 19a, 20a, 21a (area framed by a dotted circle).

Figure 13:
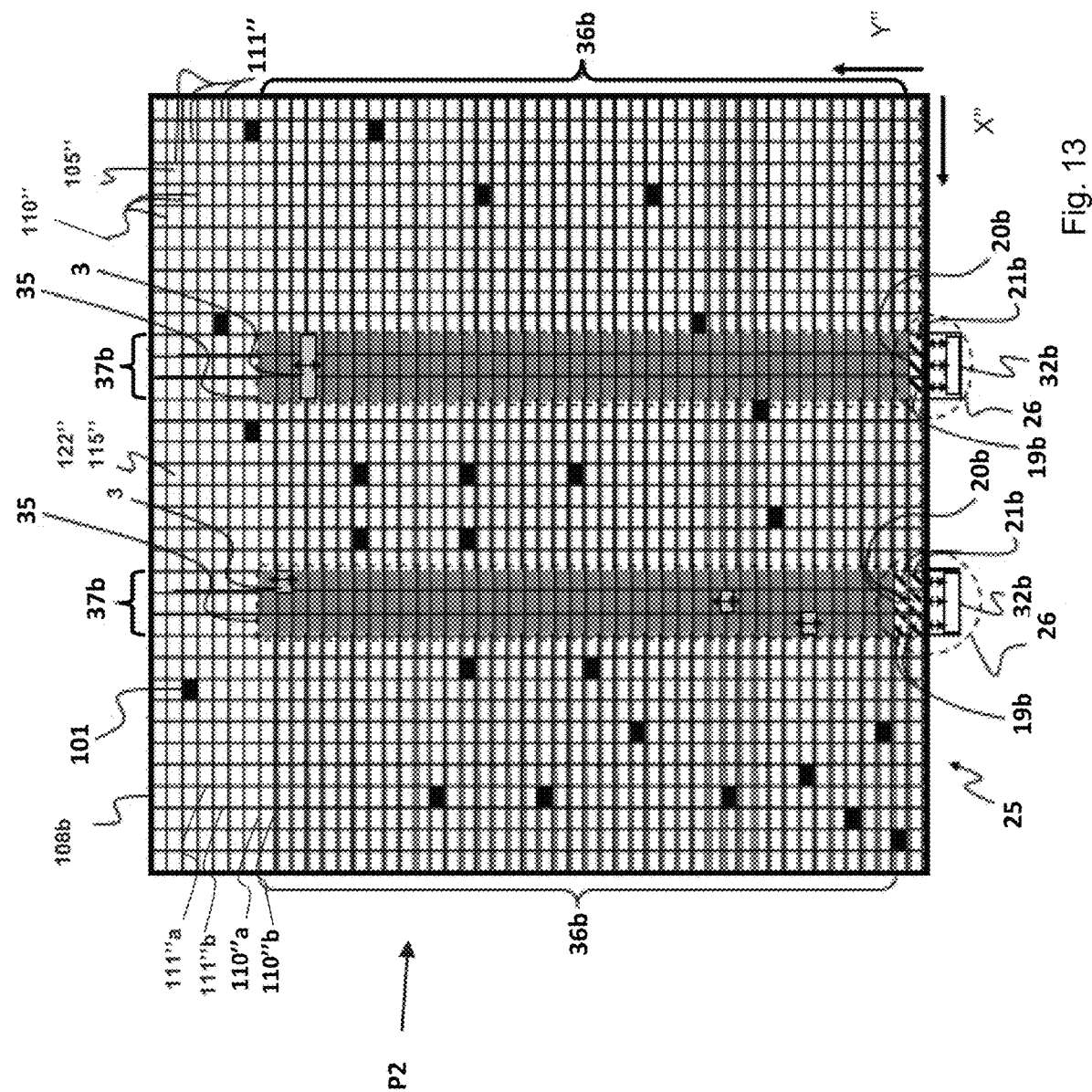
FIG. 13 is a top view of grid of an automated storage and retrieval system showing the second track system as illustrated in FIGS. 7-11

Similarly, the second track system 108b may be arranged with second transfer columns 36b, 37b, see FIG. 13. In addition, a second access station 32b may also be located here (not illustrated). Storage container port(s)/port column(s) 19b, 20b for transferring the storage containers 106 between the second track system 108b and a second access station 32b. The black rectangles symbolize exemplary positions of container handling vehicles 101 intended to transport storage containers (not shown) to and from their respective grid columns 112 within the framework (white area), while light grey rectangles symbolize exemplary positions of port access vehicles 3 intended to transport the picked storage containers between temporary storage positions within a transfer zone 35 of the framework (dark grey area) and a port zone 26 containing one or more container port columns 19b, 20b, 21b (area framed by a dotted circle).

The automated storage and retrieval system may be arranged with the first and second transfer columns, but may also be arranged with either the first or second transfer columns. When the system is arranged with just the first transfer columns 36a, 37a the storage handling vehicles 101 are arranged for picking up the storage containers 106 at both the first and second track systems 108a, 108b and for delivering these for temporary storage in the first transfer columns 36a, 37a located beneath the first track system 108a. Alternatively, when the system is arranged with just the second transfer columns 36b, 37b the storage handling vehicles 101 are arranged for picking up the storage containers 106 at both the first and second track systems 108a, 108b and for delivering these for temporary storage in the second transfer columns 36b, 37b located beneath the second track system 108b. When the automated storage and retrieval system is arranged with both first transfer columns 36a, 37a and second transfer columns 36b, 37b these shared possibilities for temporary storage is coordinated for the efficient handling of the storage containers 106 and provides the opportunity for a dynamic adjustment of the temporary storage according to the specific need at the time.

FIG. 12 also illustrates the first track system 108a comprising the first set of first set of parallel tracks 110' arranged in a first horizontal plane P1 and extending in the first direction of the first track system X' and the second set of parallel tracks 111' arranged in the first horizontal plane P1 and extending in a second direction Y' of the first track system 108a which is orthogonal to the first direction of the first track system X'. The grid pattern in the first horizontal plane P1 comprises a plurality of adjacent grid cells 122', each grid cell of the first track system comprising a grid opening 115' defined by a pair of neighboring tracks 110'a, 110'b of the first set of tracks 110' of the first track system 108a and a pair of neighboring tracks 111'a, 111'b of the second set of tracks 111' of the first track system 108a. Further the storage columns 105' are illustrated located beneath the first track system 108a for storing storage containers in a plurality of stacks, where each storage column 105' is located vertically below a grid opening 115'.

FIG. 13 further illustrates the second track system 108b comprising the first set of third set of parallel tracks 110" arranged in the second horizontal plane P2 and extending in the first direction of the second track system X" and the fourth set of parallel tracks 111" arranged in the second horizontal plane P2 and extending in a second direction Y" of the second track system 108b which is orthogonal to the first direction of the second track system X". The grid pattern in the second horizontal plane P2 comprises a plurality of adjacent grid cells 122", each grid cell of the second track system 108b comprising a grid opening 115" defined by a pair of neighboring tracks 110"a, 110"b of the third set of tracks 110" of the second track system 108b and a pair of neighboring tracks 111"a, 111"b of the fourth set of tracks 111" of the second track system 108b. Further the storage columns 105" are illustrated located beneath the second track system 108b for storing storage containers in a plurality of stacks, where each storage column 105" is located vertically below a grid opening 115".

FIG. 11 shows the storage facility 60 with a first storage space 61 that has an inner ceiling height IC1 and an adjoining second storage space 62 with an inner ceiling height IC2 that is smaller than the inner ceiling height IC1 of the first storage space 61. The first track system 108a is located in the first storage space 61 at a height H1 chosen to fit with the inner ceiling IC1 for an optimal utilization of the first storage space 61 and likewise the second track system 108b is positioned at a second height H2 for fitting with the inner ceiling height IC2 of the second storage space 62. As the first storage space 61 adjoins the second storage space 62, the first and second track system 108a, 108b are positioned so that a part of an outer perimeter C1 of the first track system 108a is neighboring or proximate/adjacent to at least a part of an outer circumference C2 of the second track system 108b. The vehicle lift device 4 is positioned in the space between the first and second track system 108a, 108b but may also be located in a shaft (not shown) of the first track system 108 a. When located in a shaft, the vehicle lift device 4, the first and second track system 108a, 108b might be positioned so that a part of the outer circumference C1 of the first track system 108a coincides (when viewed from above) with at least a part of the outer circumference C2 of the second track system 108b.

Figure 14:
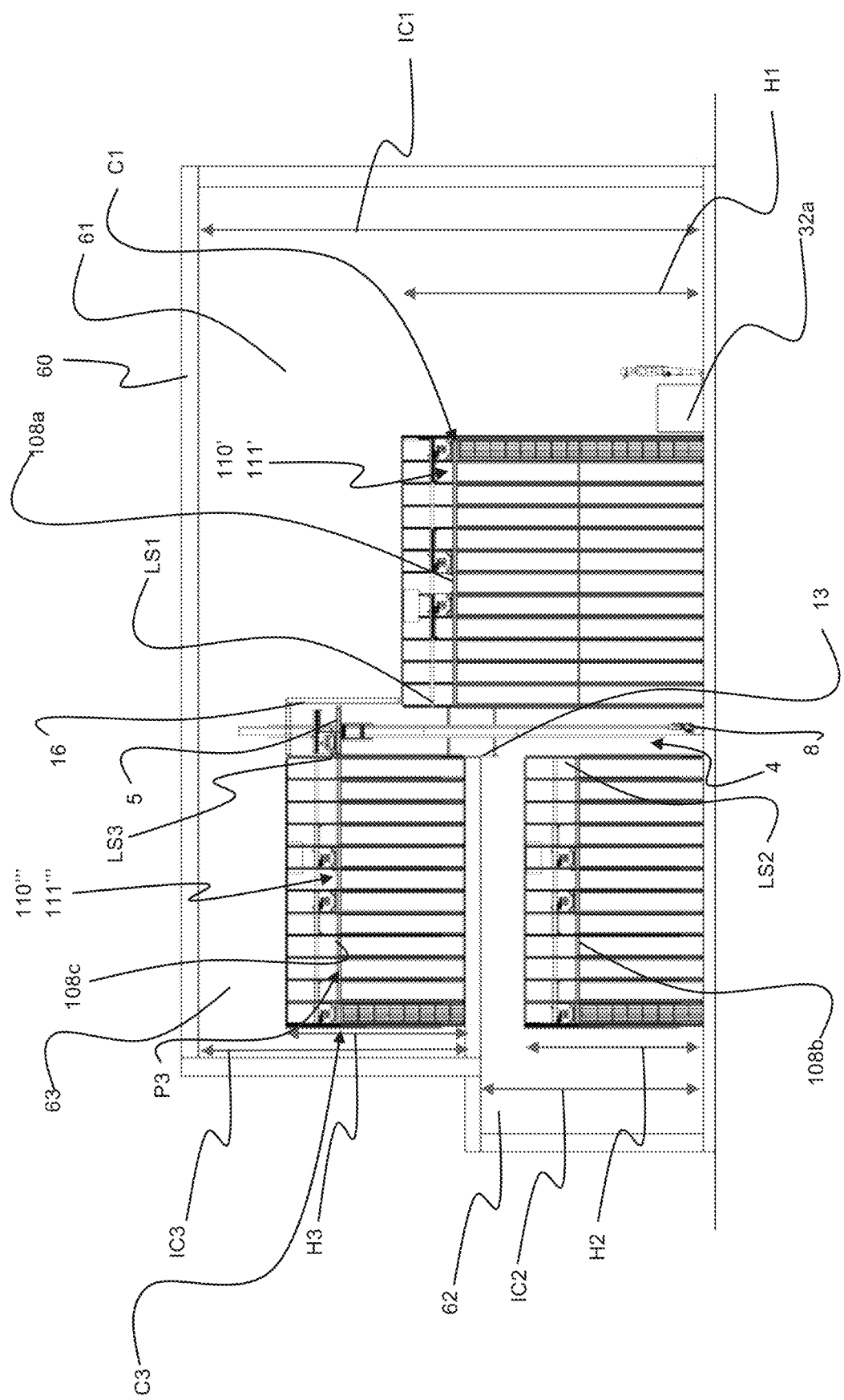
FIG. 14-15 are side views of an automated storage and retrieval system according to an exemplary embodiment of the present invention located in a storage facility with three storage spaces
Figure 15:
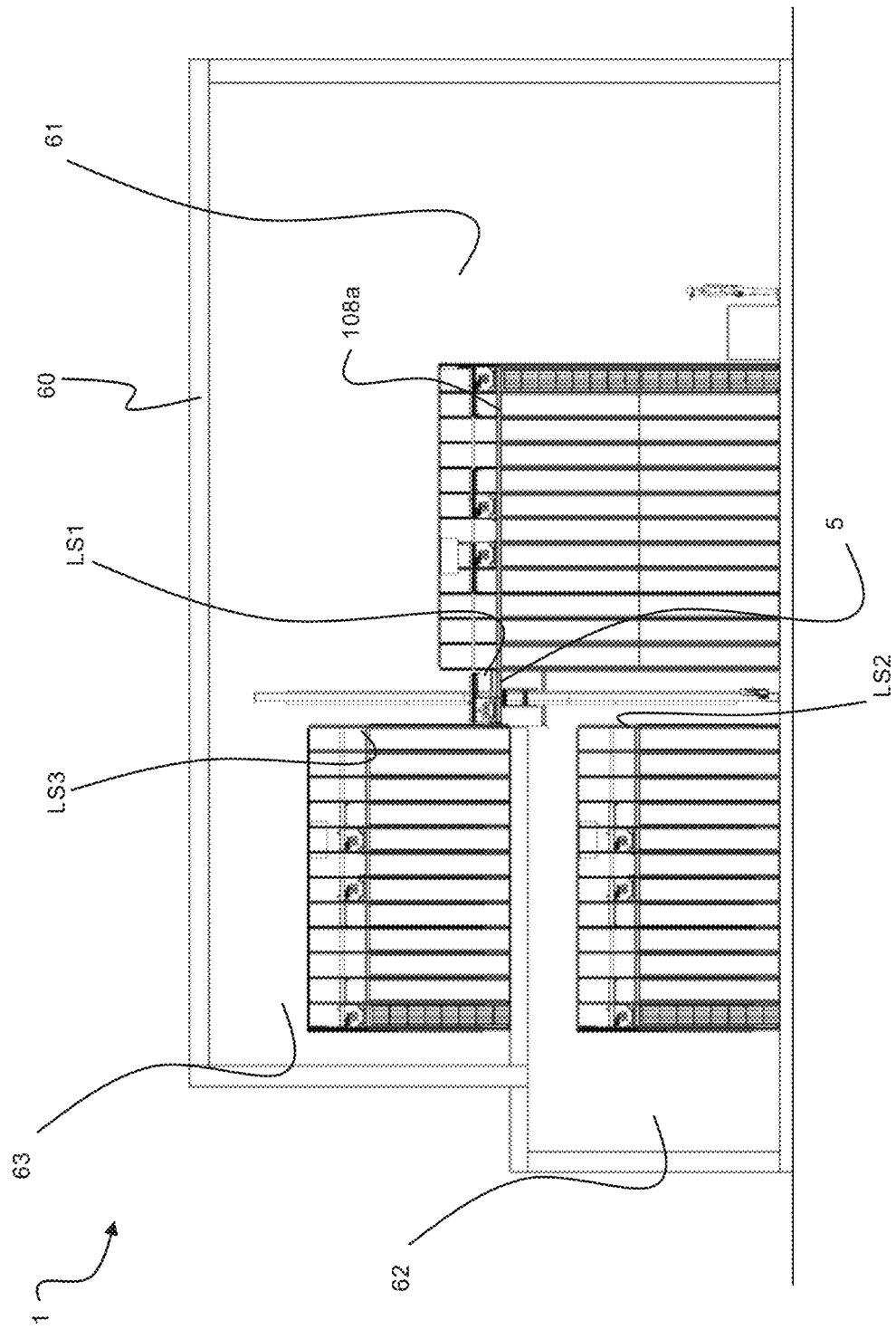

FIGS. 14 and 15 show the storage facility 60 with three storage spaces; first storage space 61 with the inner ceiling height IC1, an adjoining second storage space 62 with inner ceiling height IC2 and further a third storage space 63 with the inner ceiling height IC3. The third storage space 63 adjoins the first storage space and has an inner ceiling height IC3 that is smaller than the inner ceiling height IC1 of the first storage space 61. As explained previously with reference to FIG. 10, the first and second track systems 108a, 108b are located in their respective storage spaces at heights for optimal utilization of the available storage spaces, wherein the first and second track systems 108a, 108b are arranged the first and second horizontal planes P1, P2 which are vertically displaced relative each other.

Further a third track system 108c is located in the third storage space 63 at a height H3 chosen to fit with the inner ceiling IC3 for an optimal utilization of the third storage space 63. The third track system 108c has a fifth set of parallel tracks 110'" and extending in a first direction of the third track system, and a sixth set of parallel tracks 111'" extending in a second direction of the third track system. The fifth and sixth sets of tracks 110'", 111'" form a grid pattern in a third horizontal plane P3 which is vertically displaced relative to the first and second horizontal plane P1, P2. As the first storage space 61 adjoins the second storage space 62 and the third storage space 63, the first track system 108a is positioned so that a part of an outer circumference C1 of the first track system 108a is neighboring or proximate/adjacent to at least a part of an outer circumference C2 of the second track system 108b and at least a part of an outer circumference C3 of the third track system 108c. The vehicle lift device 4 is positioned in the space between the first track system 108a, the second track system 108b and third track system 108c respectively, but may also be located in a shaft (not shown) in the first track system 108a and extending above the first track system 108a for reaching the third track system 108c. When located in a shaft, the vehicle lift device 4, the first, second and third track system 108a, 108b, 108c might be positioned so that a part of the outer circumference C1 of the first track system 108a coincide with at least a part of the outer circumference C2 of the second track system 108b and/or the outer circumference C3 of the third track system 108c.

A third lift stop position LS3 ensures access between the between the support and transport platform 5 and the third track system 108c, as shown in FIG. 14. FIG. 15 shows the support and transport platform 5 in the first lift stop position LS1 of the first track system 108a. The first track system 108a is arranged with a first access station 32a which may be common for all the storage containers stored below first, second and third track systems 108a, 108b, 108c. It is also possible to arrange access stations below the second or third track systems 108a, 108b, and arrange the access stations below each of the first, second and third track systems 108a, 108b, 108c.

In addition to the vertical support structure 13, an additional support structure 16 (shown in FIG. 14) can also be provided to support the vehicle when transported to and from the third stop position LS3.

Figure 16:
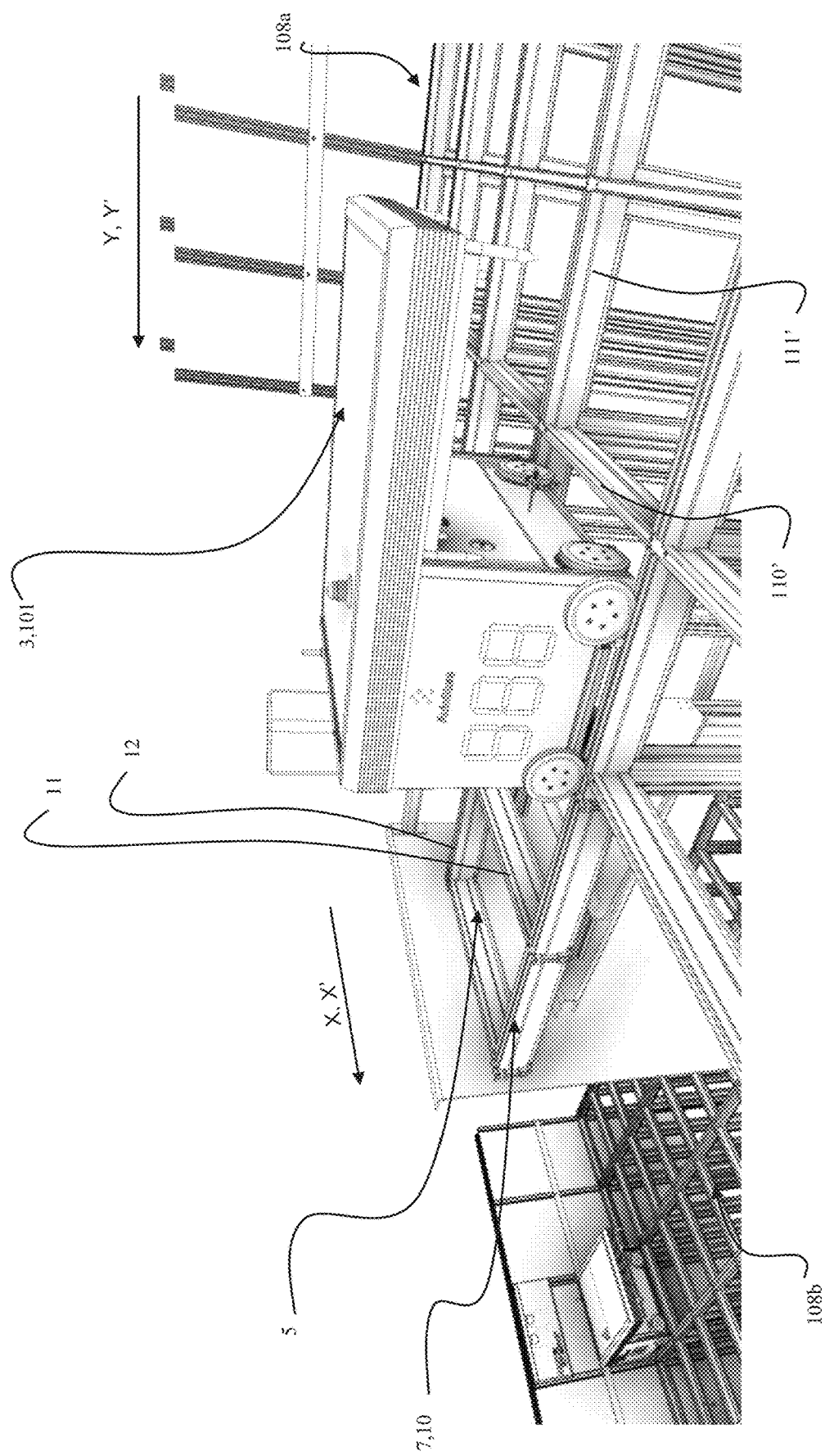
FIG. 16 shows a vehicle in transfer between a first track system and a platform with a guiding and positioning structure configured as a platform track arrangement according to an exemplary embodiment of the present invention.

FIG. 16 shows the support and transport platform 5 with a guiding and positioning structure 7 configured as a platform track arrangement 10 for maintaining the vehicle 3, 101 in a motionless or near motionless position on the support and transport platform 5 during the transfer for example between the first and second lift stop positions LS1, LS2. The platform track arrangement 10 allows for continuous movement of the vehicle 3,101 when relocating between the platform track arrangement 10 and the various track systems. In FIG. 16, the vehicle 3,101 is shown moving between the platform track arrangement 10 and the first track system 108a. The platform track arrangement 10 comprises at least one of a set of parallel tracks 11 extending in the first direction X and a set of parallel tracks 12 extending in the second direction Y. The platform track arrangement 10 is configured so that when positioned in the first lift stop position LS1 as shown in FIG. 16, the platform track arrangement 10 is vertically leveled with the first track system 108a. The vertical leveling ensures horizontal alignment between the platform track arrangement 10 and the first system 108a, thereby ensuring smooth transportation when moving the vehicle to and from the support and transport platform 5. The set of parallel tracks 11 of the platform track arrangement 10 extending in the first direction X is in parallel with the first set of parallel tracks 110' of the first track system 108a extending in the first direction X', and the set of parallel tracks 12 of the platform track arrangement 10 extending in the second direction Y is in alignment with the second set of parallel tracks (111') of the first track system (108a) extending in the direction Y'.

Figure 17:
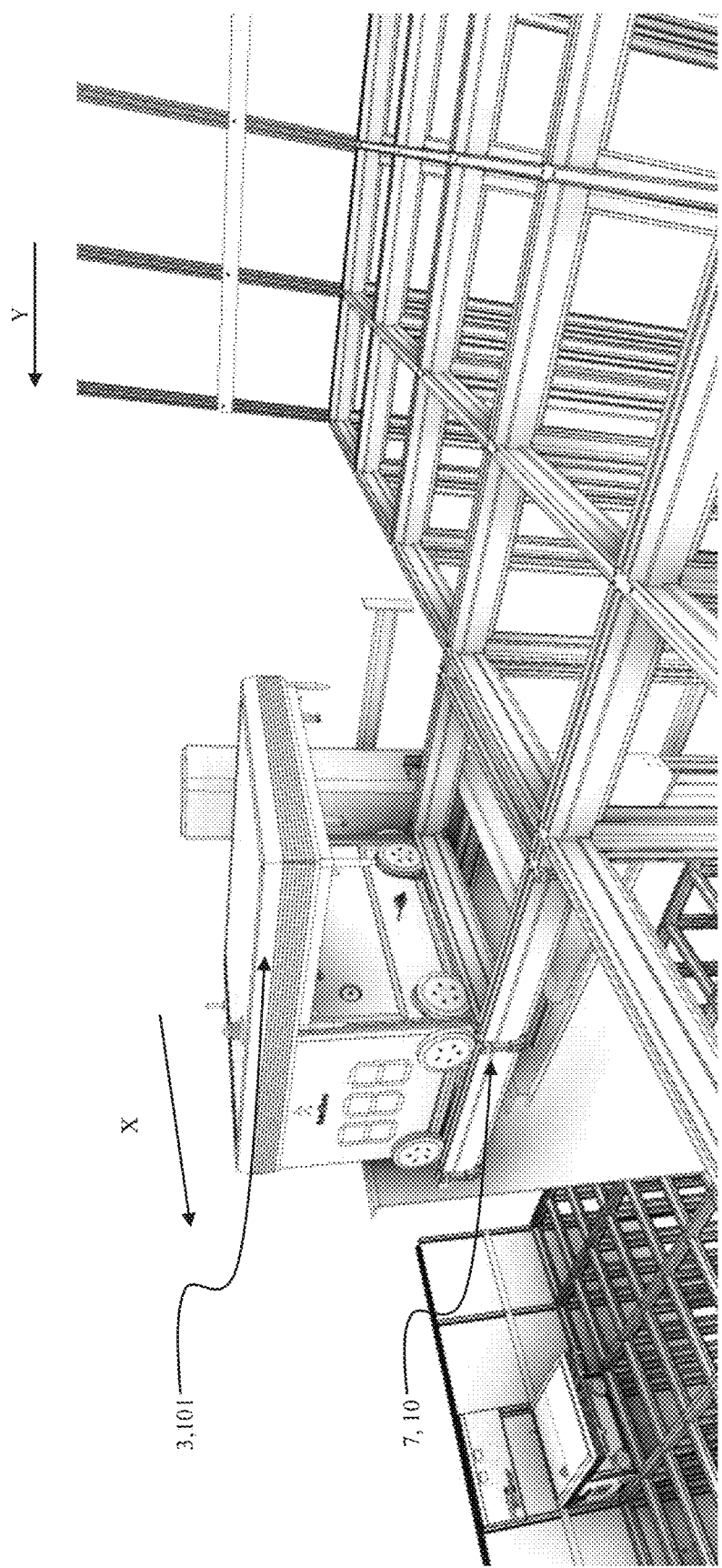
FIG. 17 shows a vehicle arranged on the platform as shown in FIG. 16.

FIG. 17 shows the vehicle 3,101 positioned on the support and transport platform 5 and ready to be transported to another lift stop position for instance the second lift stop position LS2. When arriving in the second lift stop position LS2 the platform track arrangement 10 is vertically leveled with the second track system 108b and horizontal alignment is ensured between the platform track arrangement 10 and the second track systems 108b, for smooth transportation when moving the vehicle 3, 101 to and from the support and transport platform 5.

Figure 18:
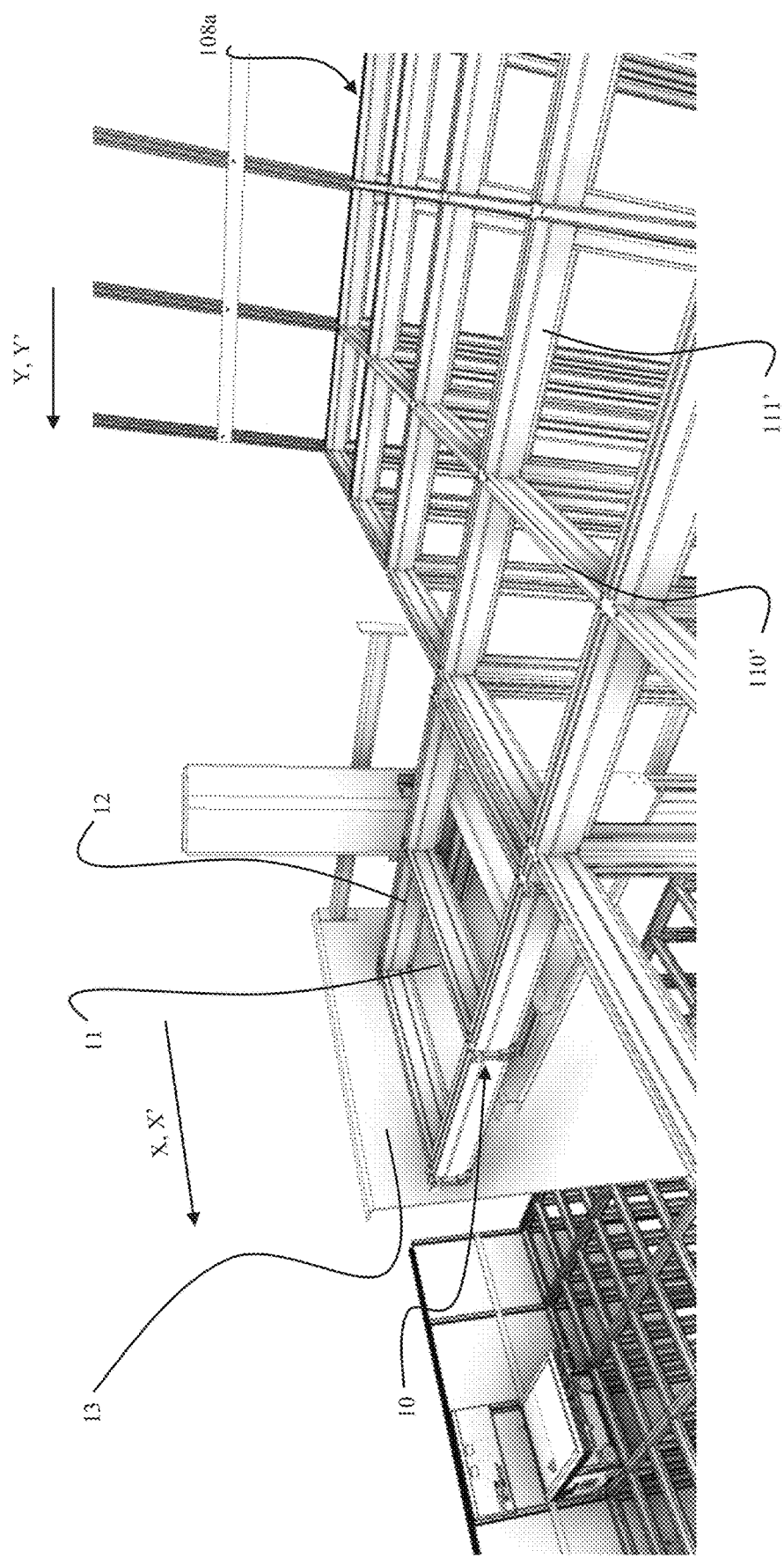
FIG. 18 shows the track arrangement of FIGS. 16 and 17 without the vehicle.

FIG. 18 shows the support and transport platform 5 without a vehicle positioned on the track arrangement 10 and at the first lift stop position LS1 in level with first track system 108a. However, the same configuration of the track arrangement 10 of the vehicle lift device will be found when arranged in the second and third stop position LS1 and LS2 of the second and third track system 108b, 108c respectively.

Depending on whether the location of the vehicle lift device 4 is either on the side of the first track systems 108a extending in the first direction X' or in the second direction Y', the vehicle 3, 101 will move on either the set of parallel tracks 11 extending in the X direction of the platform track arrangement 10 or on the second set of parallel tracks 12 extending in the direction Y of the platform track arrangement 10 when moving in between the support and transport platform 5 and the first track systems 108a. When the vehicle lift device 4 is positioned on the side of the first track system 108a extending in the first direction X', as shown in FIG. 16-18 the vehicle moves on the second set of parallel tracks 12 of the platform track arrangement 10 and on the second set of parallel tracks 111' of the first track system 108a. And correspondingly when the vehicle lift device 4 is positioned on the side of the first track system 108a extending in the second direction Y', the vehicle 3,101 moves on the set of parallel tracks 11 of the platform track arrangement 10 and on the first set of parallel tracks 110' of the first track systems 108a, see FIG. 18.

Figure 19:
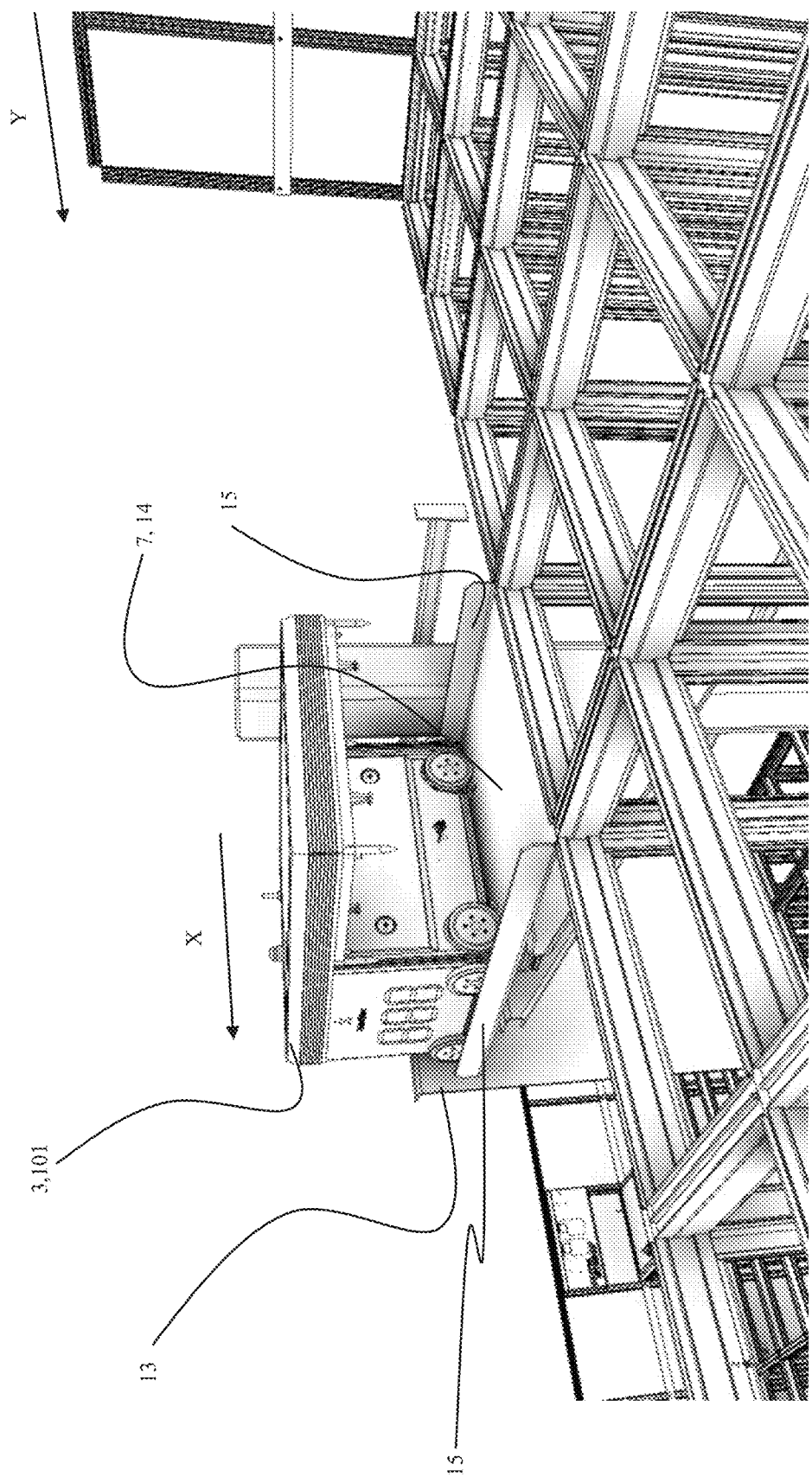
FIG. 19 shows a platform with an alternative guiding and positioning structure according to an exemplary embodiment of the present invention.

FIG. 19 shows an alternative embodiment of the guiding and positioning structure 7 comprising base plate structure 14 arranged with side walls 15 which project vertically upwards from the base plate structure 14. The side walls 15 and the vertical support structure 13 ensures that the vehicle 3,101 is kept in the motionless or near motionless position during transportation on the support and transport platform 5. Each side wall has a longitudinal extent in the second direction Y. The number of side walls 15 extending longitudinally in the second direction X may be two as illustrated in FIG. 19, when the vehicle lift device 4 is positioned on the side extending in the first direction X.

And correspondingly when the vehicle lift device 4 is positioned on the side extending in the second direction Y, the side walls 15 will be arranged extending longitudinally in the first direction X.

The number of side walls may be chosen dependent on the specific need for support during transport, and may in one aspect comprise three side walls, wherein at least one of the side walls may be adjusted between an open and closed position for letting the vehicle on and off the support and transport platform 5.

Figure 20:
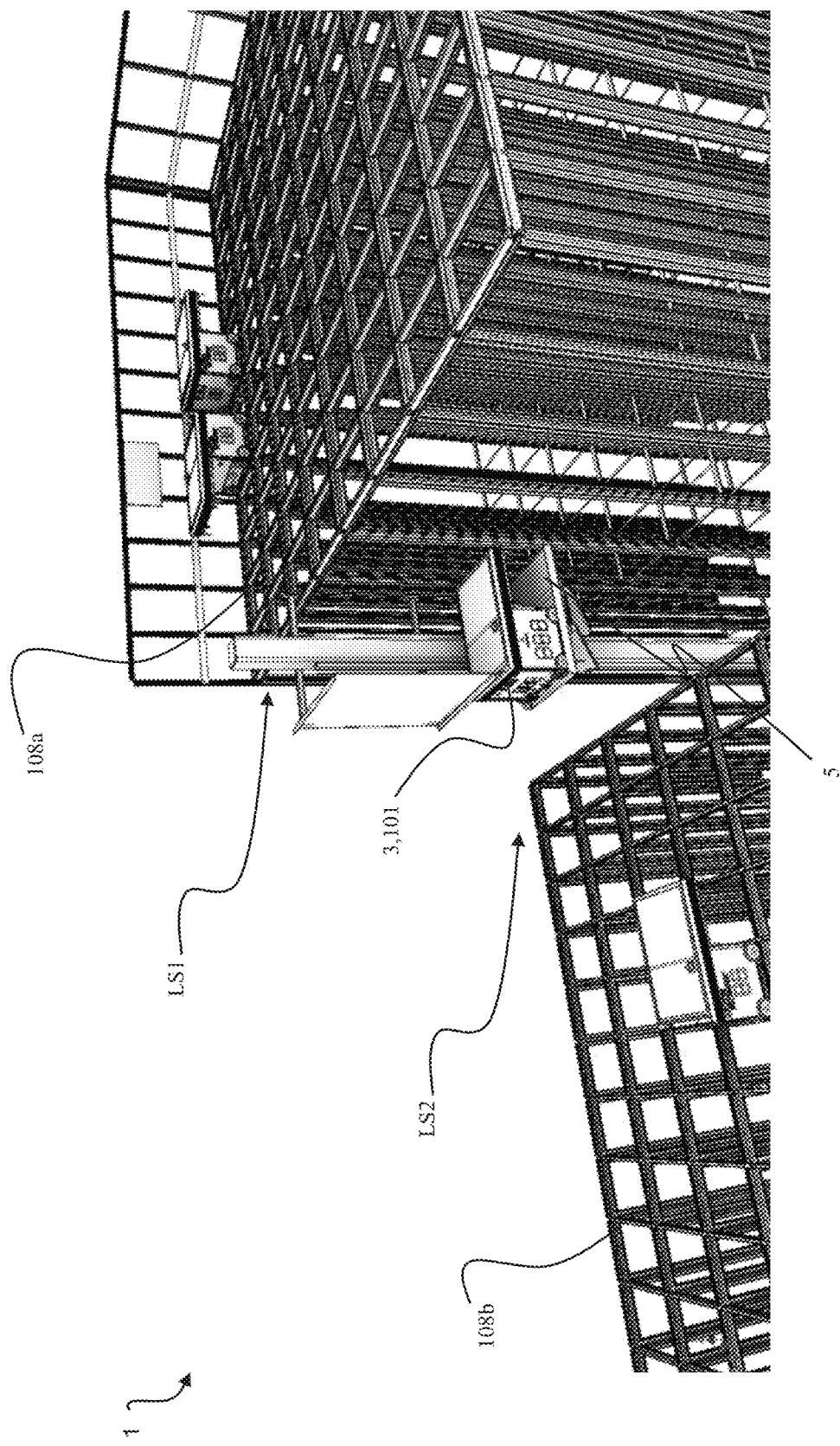
FIG. 20 shows the platform as shown in FIG. 19 in between first and second track systems.

FIG. 20 shows the vehicle 3,101 transported on the support and transport platform 5 of FIG. 19, and arriving at the second lift stop position LS2 at the second track system 108b.

REFERENCE NUMERALS

1 Storage and retrieval system
3 Vehicle/port access vehicle/second vehicle
4 Vehicle lift device
5 Support and transport platform/platform
6 Lift mechanism
7 Guiding and positioning structure
10 Platform track arrangement
11 Set of parallel tracks of the platform track arrangement extending in the first direction X.
12 Set of parallel tracks of the platform track arrangement extending in the second direction Y
13 Vertical support structure
14 Base plate structure
15 Side walls
16 Additional support structure
19, 19a, 19b First port column/first port/port column
20, 20a, 20b Second port column/second port/port column
21, 21a, 21b Third port column/third port/port column
25 Storage zone
26 Port zone
32 Access station
32a First access station
32b Second access station
35 Transfer zone
36,37 Transfer columns
36a, 37a First track system transfer columns
36b, 37b Second track system transfer columns
46 Vehicle sections
47 Vehicle body
48 Wheels
50 Horizontal bar or frame
51,52 Container gripping device
53, 54 Container lifting and holding device
60 Storage facility
61 First storage space
62 Second storage space
100 Framework structure/framework
101 Storage container vehicle/first vehicle/container handling vehicle
101a Vehicle body of the storage container vehicle 101
101b Drive means/wheels in first direction (X)
101c Drive means/wheels in second direction (Y)
101d Gripping device
102 Upright members of framework structure
103 Horizontal members of framework structure
104 Storage grid/three-dimensional grid
105 Storage column
105' Storage column of first track system 108a
105" Storage column of second track system 108b
106 Storage container
107 Stack
108 Rail system/track system
108a First track system
108b Second track system
108c Third track system
110 Parallel tracks in direction X
Set of parallel tracks in direction Y
110' First set of parallel tracks
110" Third set of parallel tracks
110''' Fifth set of parallel tracks
110a, 110b Pair of parallel tracks forming the set of parallel tracks 110
110'a, 110'b Pair of neighboring tracks of set of parallel tracks 110'
110"a, 110"b Pair of neighboring tracks of set of parallel tracks 110"
111 Parallel tracks in direction Y
Set of parallel tracks in direction Y
111' Second set of parallel tracks
111" Fourth set of parallel tracks
111' Sixth set of parallel tracks
111a, 111b Pair of parallel tracks forming the set of parallel tracks 111

111'a, 111'b Pair of neighboring tracks of set of parallel tracks 111'
111"a, 111"b Pair of neighboring tracks of set of parallel tracks 111"
112 Grid column
115 Grid opening
115' Grid opening in the first track system 108a
115" Grid opening in the second track system 108b
122 Footprint/grid cell/storage cell
122' Footprint/grid cell/storage cell in first track system 108a
122" Footprint/grid cell/storage cell in second track system 108b
X A direction in the horizontal plane
X' First direction in the horizontal plane of the first track system
X" First direction in the horizontal plane of the second track system
Y A direction in the horizontal plane orthogonal to the X direction
Y' Second direction in the horizontal plane of the first track system orthogonal to the X' direction
Y" Second direction in the horizontal plane of the second track system orthogonal to the X" direction
P Horizontal plane
P1 Horizontal plane of the first track system
P2 Horizontal plane of the second track system
P3 Horizontal plane of the third track system
LS1 First lift stop position
LS2 Second lift stop position
LS3 Third lift stop position
C1 Outer perimeter of the first track system
C2 Outer perimeter of the second track system
C3 Outer perimeter of the third track system
IC1 First storage inner ceiling height
IC2 Second storage inner ceiling height
IC3 Third storage inner ceiling height
H1 Height of first track system in first storage space
H2 Height of second track system in second storage space
H3 Height of third track system in second storage space

The invention claimed is:

1. An automated storage and retrieval system comprising:
a first track system comprising:
   a first set of parallel tracks arranged in a first horizontal plane and extending in a first direction of the first track system and
   a second set of parallel tracks arranged in the first horizontal plane and extending in a second direction of the first track system which is orthogonal to the first direction of the first track system,
   said first and second sets of tracks of the first track system forming a grid pattern in the first horizontal plane comprising a plurality of adjacent grid cells, each grid cell of the first track system comprising a grid opening defined by a pair of neighboring tracks of the first set of tracks and a pair of neighboring tracks of the second set of tracks, and
   storage columns located beneath the first track system for storing storage containers in a plurality of stacks, wherein each storage column is located vertically below a grid opening;
a second track system comprising:
   a third set of parallel tracks arranged in a second horizontal plane and extending in a first direction of the second track system, and
   a fourth set of parallel tracks arranged in the second horizontal plane and extending in a second direction of the second track system which is orthogonal to the first direction of the second track system,
   said third and fourth sets of tracks forming a grid pattern in the second horizontal plane comprising a plurality of adjacent grid cells, each grid cell of the second track system comprising a grid opening defined by a pair of neighboring tracks of the third set of tracks and a pair of neighboring tracks of the fourth set of tracks,
   storage columns located beneath the second track system for storing storage containers in a plurality of stacks, wherein each storage column is located vertically below a grid opening;
wherein the first horizontal plane of the first track system and second horizontal plane of the second track system are arranged vertically displaced relative each other,
wherein the automated storage and retrieval system further comprises:
   a vehicle lift device for transfer of at least one vehicle arranged on the first track system to the second track system and vice versa,
the vehicle lift device comprising:
   a platform arranged to carry the vehicle, the platform comprising a guiding and positioning structure for positioning and maintaining the vehicle in a motionless or near motionless position on the platform during the transfer between the first and second lift stop positions, the guiding and positioning structure comprising a platform track arrangement comprising at least one set of parallel tracks extending in a direction X and at least one set of parallel tracks extending in a direction Y perpendicular to the direction X, and
   a lift mechanism arranged to move the platform between:
      a first lift stop position establishing access between the platform and the first track system for enabling relocation of the vehicle between a support position on the platform and an operative position on the first track system, and
      a second lift stop position establishing access between the platform and the second track system for enabling relocation of the vehicle between the support position on the platform and an operative position on the second track system.

2. The system according to claim 1, wherein the lift mechanism is configured to move the platform in a purely vertical direction between the first lift stop position and the second lift stop position.

3. The system according to claim 1, wherein the guiding and positioning structure is adjacent and flush with the first track system when the guiding and positioning structure is placed in the first lift stop position for enabling relocation of the vehicle between the guiding and positioning structure and the first track systems and wherein the guiding and positioning structure is adjacent and flush with the with the second track system when the guiding and positioning structure is placed in the second lift stop position for enabling relocating of the vehicle between the guiding and positioning structure and the second track systems.

4. The system according to claim 1, wherein the guiding and positioning structure comprises:
   a base plate structure arranged with at least two side walls for receiving the vehicle in the area defined by the at least two side walls and the base plate structure, such that the guiding and positioning structure is adjacent and flush with the first track system when guiding and positioning structure is placed in the first lift stop position for enabling relocating of the vehicle between the guiding and positioning structure and the first track systems and the guiding and positioning structure is vertically levelled with the second track system when the guiding and positioning structure is placed in the second lift stop position for enabling relocating of the vehicle between the guiding and positioning structure and the second track systems.

5. The system according to claim 1, wherein vehicle lift device further comprises a vertical support structure for supporting the vehicle when the platform is moving between the first lift stop position and the second lift stop position.

6. The system according to claim 1, wherein the vehicle lift device is defining a gap between an outer perimeter relative to the horizontal plane of the first track system and an outer perimeter relative to the horizontal plane of the second track system.

7. The system according to claim 1, wherein the system further comprises:
 a third track system comprising:
  a fifth set of parallel tracks arranged in a third horizontal plane and extending in a first direction of the third track system, and
  a sixth set of parallel tracks arranged in the third horizontal plane and extending in a second direction of the third track system which is orthogonal to the first direction of the third track system, said fifth and sixth sets of tracks forming a grid pattern in the third horizontal plane comprising a plurality of adjacent grid cells, each grid cell of the third track system comprising a grid opening defined by a pair of neighboring tracks of the fifth set of tracks and a pair of neighboring tracks of the sixth set of tracks,
 storage columns located beneath the third track system, for storing storage containers in a plurality of stacks wherein each storage column is located vertically below a grid opening;
 wherein the third horizontal plane is vertically displaced relative the first horizontal plane of the first track system and second horizontal plane of the second track system,
 wherein the lift mechanism is arranged to move the platform between the first lift stop position, the second lift stop position, and
 a third lift stop position establishing access between the platform and the third track system for enabling relocation of the vehicle between a support position on the platform and an operative position on the third track system.

8. The system according to claim 7, wherein at least a part of an outer perimeter relative to the horizontal plane of the third track system is adjacent to at least a part of an outer perimeter relative to the horizontal plane of the first track system and/or at least a part of an outer perimeter relative to the horizontal plane of the second track system.

9. A storage facility comprising the automated storage and retrieval system in accordance with claim 1, wherein the storage facility comprises:
 a first storage space for accommodation of the first track system and
 a second storage space for accommodation of the second track system, the second storage space being horizontally shifted relative to the first storage space,
 wherein a minimum inner ceiling height of the first storage space is higher than a minimum inner ceiling height of the second storage space.

10. A storage facility comprising the automated storage and retrieval system in accordance with claim 9, wherein the system further comprises:
 a third track system comprising:
  a fifth set of parallel tracks arranged in a third horizontal plane and extending in a first direction of the third track system, and
  a sixth set of parallel tracks arranged in the third horizontal plane and extending in a second direction of the third track system which is orthogonal to the first direction of the third track system, said fifth and sixth sets of tracks forming a grid pattern in the third horizontal plane comprising a plurality of adjacent grid cells, each grid cell of the third track system comprising a grid opening defined by a pair of neighboring tracks of the fifth set of tracks and a pair of neighboring tracks of the sixth set of tracks,
 storage columns located beneath the third track system, for storing storage containers in a plurality of stacks, wherein each storage column is located vertically below a grid opening;
 wherein the third horizontal plane is vertically displaced relative the first horizontal plane of the first track system and second horizontal plane of the second track system,
 wherein the lift mechanism is arranged to move the platform between the first lift stop position, the second lift stop position, and
 a third lift stop position establishing access between the platform and the third track system for enabling relocation of the vehicle between a support position on the platform and an operative position on the third track system,
 wherein the storage facility further comprises:
  a third storage space for accommodation of the third track system, the third storage space being horizontally shifted relative to the first storage space,
  wherein a minimum inner ceiling height of the first storage space is higher than a minimum inner ceiling height of the third storage space.

11. A method of operating an automated storage and retrieval system comprising:
 a first track system comprising:
  a first set of parallel tracks arranged in a first horizontal plane and extending in a first direction of the first track system and
  a second set of parallel tracks arranged in the first horizontal plane and extending in a second direction of the first track system which is orthogonal to the first direction of the first track system,
  which first and second sets of tracks form a grid pattern in the first horizontal plane comprising a plurality of adjacent grid cells, each comprising a grid opening defined by a pair of neighboring tracks of the first set of tracks and a pair of neighboring tracks of the second set of tracks;
 storage columns located beneath the first track system for storing storage containers in a plurality of stacks, wherein each storage column is located vertically below a grid opening;
 a second track system comprising:
  a third set of parallel tracks arranged in a second horizontal plane and extending in a first direction of the second track system, and a second fourth of parallel tracks arranged in the second horizontal plane and extending in a second direction of the second track system which is orthogonal to the first direction of the second track system, which third and fourth sets of tracks form a grid pattern in the second horizontal plane comprising a plurality of adjacent grid cells, each comprising a grid opening defined by a pair of neighboring tracks of the first set of tracks and a pair of neighboring tracks of the second set of tracks;

storage columns located beneath the second track system for storing storage containers in a plurality of stacks, wherein each storage column is located vertically below a grid opening;

wherein the first horizontal plane of the first track system and second horizontal plane of the second track system are arranged vertically displaced relative each other, and wherein at least the first track system comprises a vehicle arranged to move on the first and/or second set of tracks of the first track system, a vehicle lift device comprising:
  a platform arranged for carrying the vehicle, the platform comprising a guiding and positioning structure for positioning and maintaining the vehicle in a motionless or near motionless position on the platform during the transfer between the first and second lift stop positions, the guiding and positioning structure comprising a platform track arrangement comprising at least one set of parallel tracks extending in a direction X and at least one set of parallel tracks extending in a direction Y being perpendicular to the direction X, and
  a lift mechanism arranged for displacement of the platform between first and second lift stop positions, wherein method comprises:
  i) moving the vehicle from the first track system on to the platform which is positioned in the first lift position,
  ii) moving the platform into a second lift stop position enabling access between the platform and the second track system,
  iii) positioning and maintaining the vehicle in a motionless or near motionless position on the platform during the transfer between the first and second lift stop positions using the guiding and positioning structure, and
  iv) moving the vehicle from the supported position on the platform and on to the second track system, wherein the vehicle is arranged to move on the third and/or fourth set of tracks of the second track system.

12. The method in accordance with claim 11, wherein
the first lift stop position establishes access between the platform and the first track system for enabling relocation of the vehicle between a support position on the platform and an operative position on the first track system, and
the second lift stop position establishes access between the platform and the second track system for enabling relocation of the vehicle between the support position on the platform and an operative position on the second track system.

* * * * *